United States Patent
Muramatsu et al.

(10) Patent No.: US 11,908,628 B2
(45) Date of Patent: *Feb. 20, 2024

(54) MULTILAYER CERAMIC ELECTRONIC COMPONENT INCLUDING EXTERNAL ELECTRODES WITH MULTILAYER STRUCTURE

(71) Applicant: Murata Manufacturing Co., Ltd., Nagaokakyo (JP)

(72) Inventors: Satoshi Muramatsu, Nagaokakyo (JP); Ken Tominaga, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,456

(22) Filed: Dec. 6, 2022

(65) Prior Publication Data

US 2023/0095128 A1    Mar. 30, 2023

Related U.S. Application Data

(63) Continuation of application No. 17/205,069, filed on Mar. 18, 2021, now Pat. No. 11,557,437.

(30) Foreign Application Priority Data

Apr. 20, 2020 (JP) .................. 2020-074660

(51) Int. Cl.
*H01G 4/30* (2006.01)
*H01G 4/008* (2006.01)
(Continued)

(52) U.S. Cl.
CPC .............. *H01G 4/30* (2013.01); *H01G 4/008* (2013.01); *H01G 4/012* (2013.01); *H01G 4/12* (2013.01); *H01G 4/232* (2013.01)

(58) Field of Classification Search
CPC .......... H01G 4/30; H01G 4/008; H01G 4/012; H01G 4/0085; H01G 4/252
See application file for complete search history.

(56) References Cited

U.S. PATENT DOCUMENTS

| | | | | |
|---|---|---|---|---|
| 2008/0210564 A1* | 9/2008 | Motoki | .................. | H10N 30/50 205/122 |
| 2008/0239617 A1* | 10/2008 | Motoki | .................... | H01G 4/30 29/25.42 |

(Continued)

OTHER PUBLICATIONS

Human translation of JP 2017-168488: [0030]; received Aug. 29, 2023.*

(Continued)

*Primary Examiner* — David M Sinclair
*Assistant Examiner* — Daniel M Dubuisson
(74) *Attorney, Agent, or Firm* — Keating & Bennett, LLP

(57) ABSTRACT

A multilayer ceramic capacitor includes an external electrode including an underlying electrode layer, a lower plating layer on the underlying electrode layer at a first end surface and a second end surface, and an upper plating layer on the lower plating layer. The underlying electrode layer is a thin film electrode including at least one selected from Ni, Cr, Cu, and Ti. The lower plating layer is a Cu plating layer including a lower layer region located closer to the multilayer body and an upper layer region located between the lower layer region and the upper plating layer, and the Cu plating layer in the lower layer region has a metal grain diameter smaller than that of the Cu plating layer located in the upper layer region.

20 Claims, 22 Drawing Sheets

(51) Int. Cl.
    *H01G 4/012*    (2006.01)
    *H01G 4/12*     (2006.01)
    *H01G 4/232*    (2006.01)

(56)         References Cited

U.S. PATENT DOCUMENTS

2009/0310276 A1*  12/2009  Tashima ............... H01G 4/30
                                                   29/25.42
2009/0323253 A1*  12/2009  Kobayashi ............ H01G 4/005
                                                    427/79
2012/0218678 A1*   8/2012  Satou ................ H01G 4/12
                                                   361/303
2017/0103853 A1*   4/2017  Zenzai ............... H01G 4/232

OTHER PUBLICATIONS

Muramatsu et al., "Multilayer Ceramic Electronic Component Including External Electrode With Multilayer Structure", U.S. Appl. No. 17/205,069, filed Mar. 18, 2021.

* cited by examiner

CROSS SECTION ALONG XIX-XIX

MULTILAYER CERAMIC ELECTRONIC COMPONENT INCLUDING EXTERNAL ELECTRODES WITH MULTILAYER STRUCTURE

CROSS REFERENCE TO RELATED APPLICATIONS

This application claims the benefit of priority to Japanese Patent Application No. 2020-074660 filed on Apr. 20, 2020. The entire contents of this application are hereby incorporated herein by reference.

BACKGROUND OF THE INVENTION

1. Field of the Invention

The present invention relates to a multilayer ceramic electronic component, and more particularly, to a multilayer ceramic electronic component including an external electrode with a multilayer structure.

2. Description of the Related Art

In recent years, electronic devices such as mobile phones and portable music players are increasingly reduced in size and thickness. Along with this, multilayer ceramic electronic components mounted in such electronic devices are also increasingly reduced in size and thickness.

A multilayer ceramic capacitor that is an example of such a multilayer ceramic electronic component includes, for example, a ceramic sintered body in which a dielectric ceramic material, such as barium titanate, and an internal electrode are alternately stacked, and a pair of external electrodes formed so as to cover each end surface of the ceramic sintered body (see Japanese Patent Laid-Open No. 8-306580).

As one method for achieving miniaturization and large capacitance, there is a technique of forming an external electrode as a plating electrode (Cu plating), as disclosed in Japanese Patent Laid-Open No. 2009-283597, for example. Japanese Patent Laid-Open No. 8-306580 discloses that a plating electrode (Cu plating) can be formed directly on the body of an electronic component to reduce the external electrode in thickness, and as the external electrode is reduced in thickness, the ceramic body can be formed as large as possible within a standard dimension to increase the internal electrode's effective area.

However, it is known that when a plating electrode (Cu plating) is formed on a ceramic body, as described in Japanese Patent Laid-Open No. 2009-283597, it insufficiently adheres to a ceramic multilayer body, the internal electrode and the like, and external moisture intrudes and moisture resistance is degraded.

Accordingly, to solve this problem, forming the plating electrode (Cu plating) may be followed by performing heat treatment to increase the grain size of the metal included in the plating electrode to increase an area brought into contact with the ceramic body to ensure that the electrode adheres to the ceramic multilayer body.

However, applying heat treatment to increase the grain size of the metal included in the plating electrode (Cu plating) increases compressive stress of the grains, and thus compressive stress of the plating electrode (Cu plating). The external electrode is formed on a first major surface and a second major surface, a first side surface and a second side surface, and a first end surface and a second end surface, and accordingly, a tensile stress is generated at a peripheral portion of the plating electrode (Cu plating) formed on the first and second major surfaces and the first and second side surfaces. When thermal stress (for example, $\Delta T$ of 230° C. in solder reflow mounting, and $\Delta T$ of 140° C. or higher and 180° C. or lower for thermal shock of a product after mounting) is applied in this state, a tensile force is concentrated at the peripheral portion of the plating electrode (Cu plating). Therefore, a force in a vertical direction, which is a direction of a stress by which the external electrode is tensioned with respect to the ceramic body, is applied to the peripheral portion of the plating electrode (Cu plating), and the ceramic body may be cracked by thermal stress. This problem is prominent as the ceramic body becomes smaller in thickness.

SUMMARY OF THE INVENTION

Preferred embodiments of the present invention provide multilayer ceramic electronic components that are each capable of reducing or preventing cracking of a multilayer body due to thermal stress during reflow mounting or the like.

According to a preferred embodiment of the present invention, a multilayer ceramic electronic component includes a multilayer body including a plurality of stacked ceramic layers and including a first major surface and a second major surface opposite to each other in a height direction, a first side surface and a second side surface opposite to each other in a width direction orthogonal or substantially orthogonal to the height direction, and a first end surface and a second end surface opposite to each other in a length direction orthogonal or substantially orthogonal to the height direction and the width direction; a first internal electrode layer on the ceramic layer and exposed at the first end surface; a second internal electrode layer on the ceramic layer and exposed at the second end surface; a first external electrode on the first end surface and connected to the first internal electrode layer; and a second external electrode on the second end surface and connected to the second internal electrode layer, the first and second external electrodes including an underlying electrode layer, a lower plating layer on the underlying electrode layer at the first end surface and the second end surface, respectively, and an upper plating layer on the lower plating layer, the underlying electrode layer being a thin film electrode including at least of Ni, Cr, Cu, or Ti, the lower plating layer being a Cu plating layer, the lower plating layer including a lower layer region located closer to the multilayer body and an upper layer region located between the lower layer region and the upper plating layer, the Cu plating layer located in the lower layer region having a metal grain diameter smaller than that of the Cu plating layer located in the upper layer region.

With the multilayer ceramic electronic component according to a preferred embodiment of the present invention, the first and second external electrodes include an underlying electrode layer, a lower plating layer on the underlying electrode layer at the first end surface and the second end surface, respectively, and an upper plating layer on the lower plating layer, the underlying electrode layer is a thin film electrode including at least one of Ni, Cr, Cu, or Ti, the lower plating layer is defined by a Cu plating layer, the lower plating layer includes a lower layer region located closer to the multilayer body and an upper layer region located between the lower layer region and the upper plating layer, and the Cu plating layer located in the lower layer region has a metal grain diameter smaller than that of the Cu plating layer located in the upper layer region, so that a multilayer ceramic electronic component according to a preferred embodiment of the present invention each ensure adhesion with the multilayer body by the underlying electrode layer defined by the thin film layer, and can reduce compressive stress throughout the lower plating layer as the lower layer region includes metal grains having a smaller grain diameter. As a result, even when thermal stress is applied, tensile stress applied to a peripheral portion of the lower plating layer is able to be reduced or prevented, and cracking of the multilayer body due to the thermal stress is able to be reduced or prevented.

Further, a multilayer ceramic electronic component according to a preferred embodiment of the present invention that includes a lower plating layer including an upper layer region including metal grains having a larger grain diameter than that of metal grains of a lower layer region of the lower plating layer ensures that the lower plating layer is thick, and are able to reduce or prevent penetration of the multilayer body by moisture. As a result, reduction or prevention of degradation of reliability in resistance to moisture is achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, multilayer ceramic electronic components according to preferred embodiments of the present invention will be described below with reference to the drawings.

A. First Preferred Embodiment

1. Multilayer Ceramic Capacitor

Figure 1:
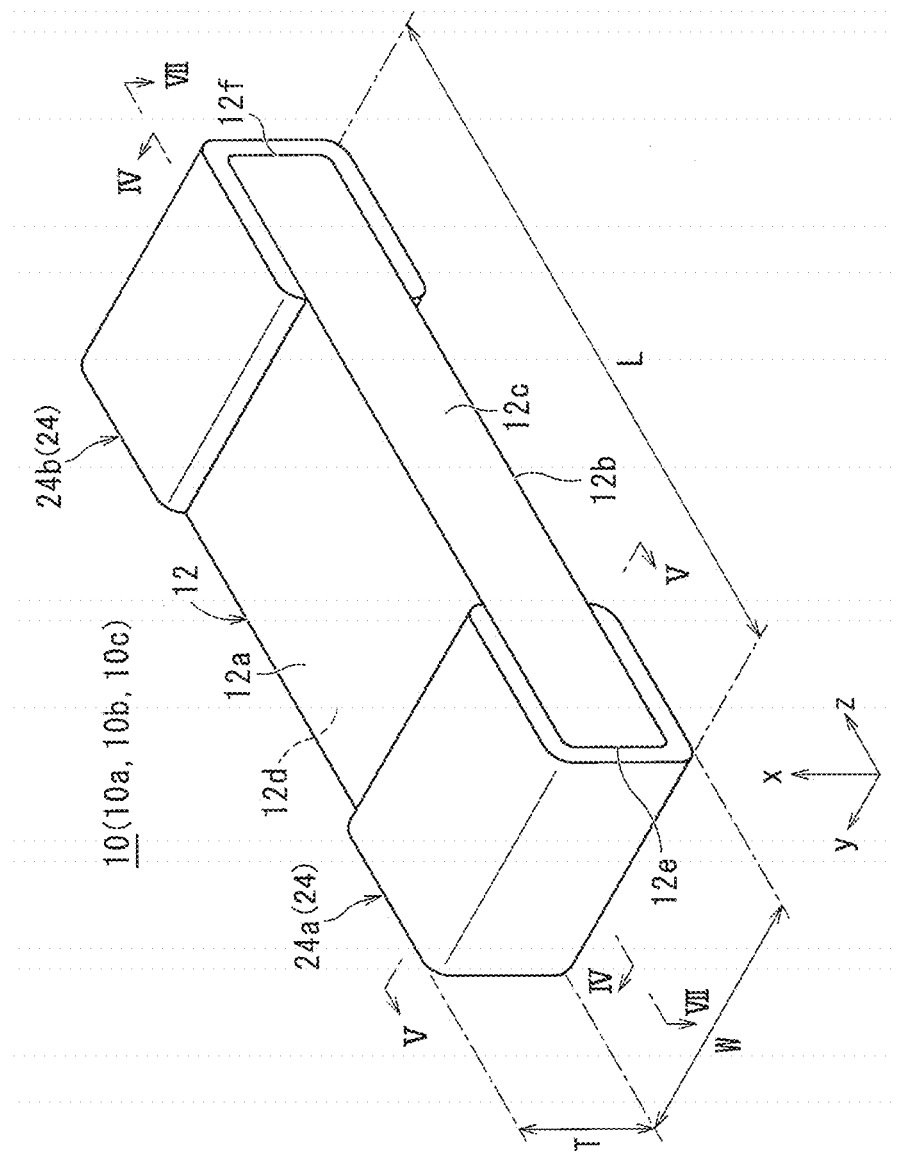
FIG. 1 is an external perspective view of a multilayer ceramic capacitor as an example of a multilayer ceramic electronic component according to a first preferred embodiment of the present invention.
Figure 2:
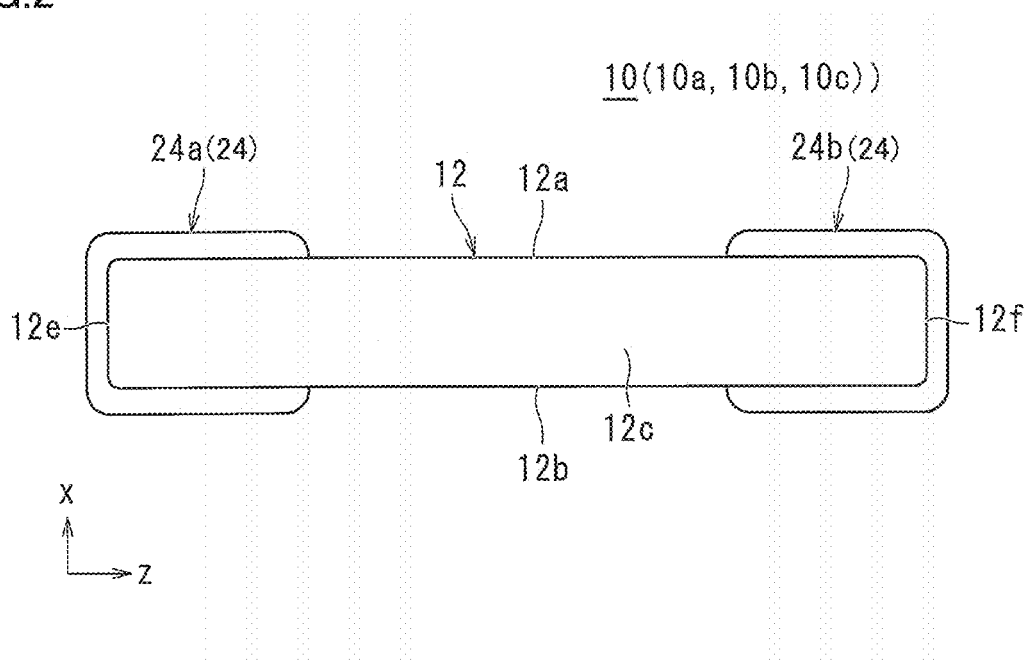
FIG. 2 is a front view of the multilayer ceramic capacitor as the example of the multilayer ceramic electronic component according to the first preferred embodiment of the present invention.
Figure 3:
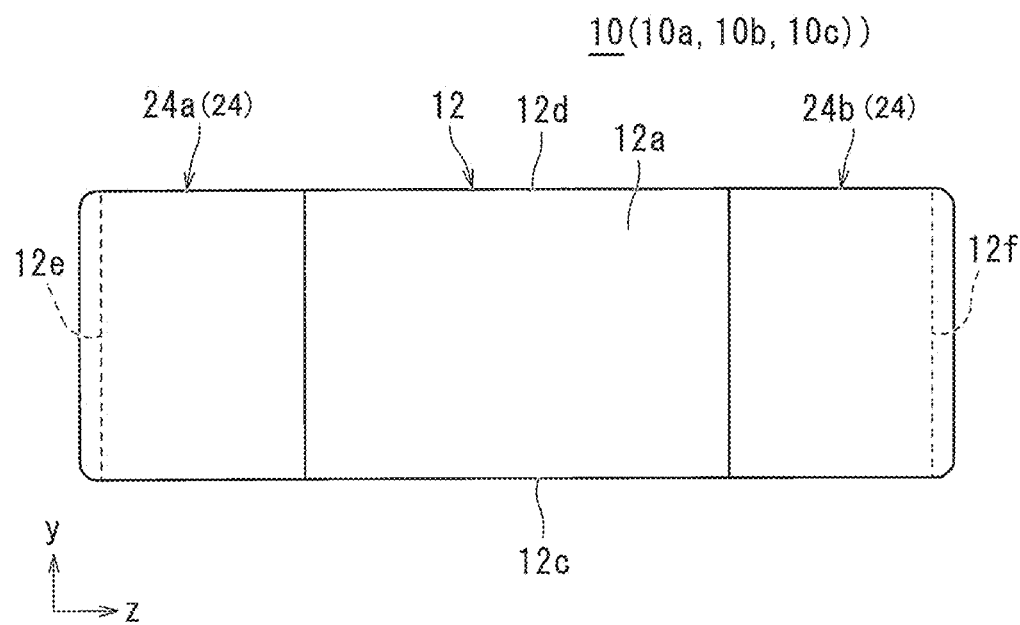
FIG. 3 is a top view of the multilayer ceramic capacitor as the example of the multilayer ceramic electronic component according to the first preferred embodiment of the present invention.
Figure 4:
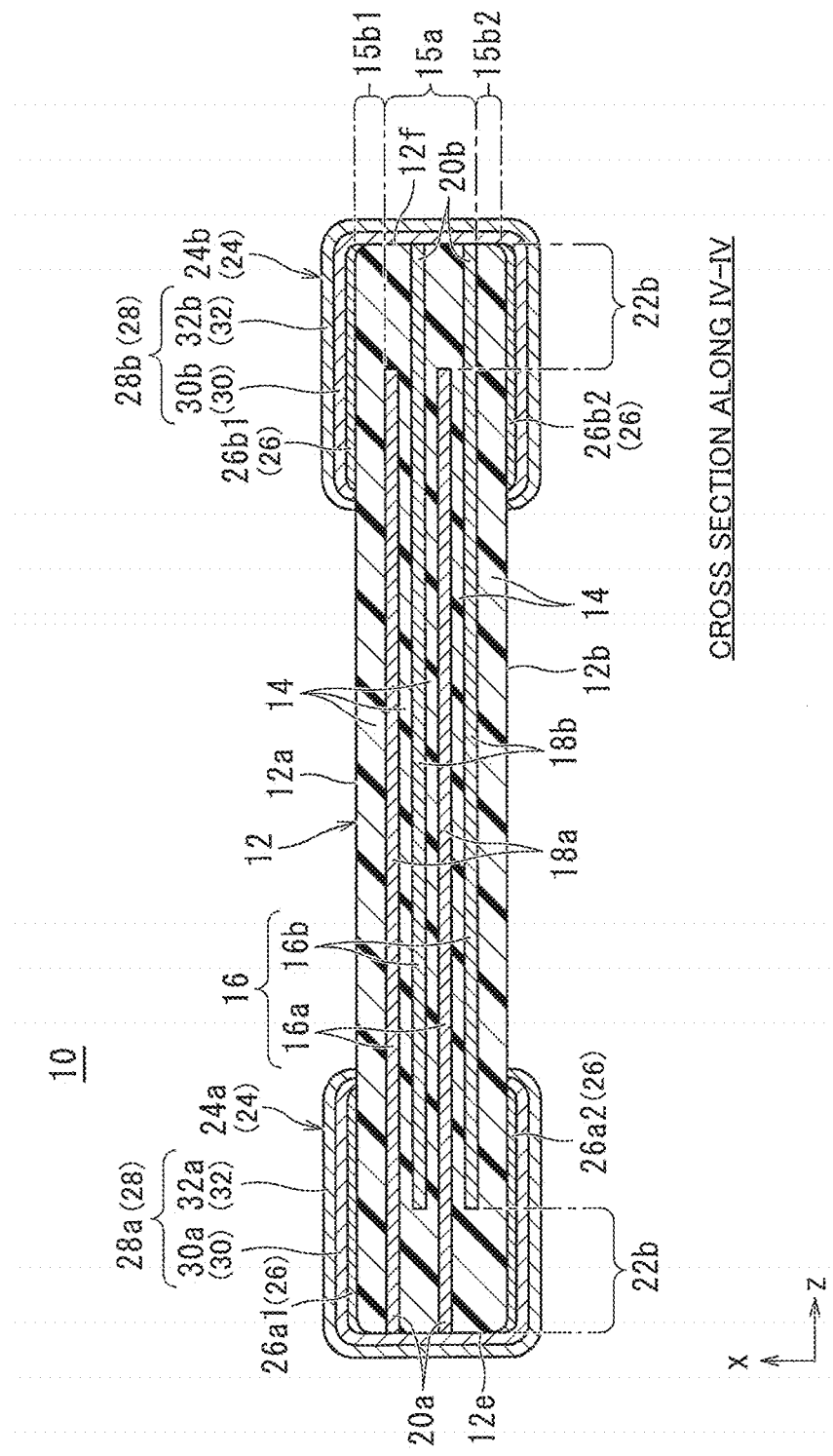
FIG. 4 is a cross section taken along a line IV-IV indicated in FIG. 1.
Figure 5:
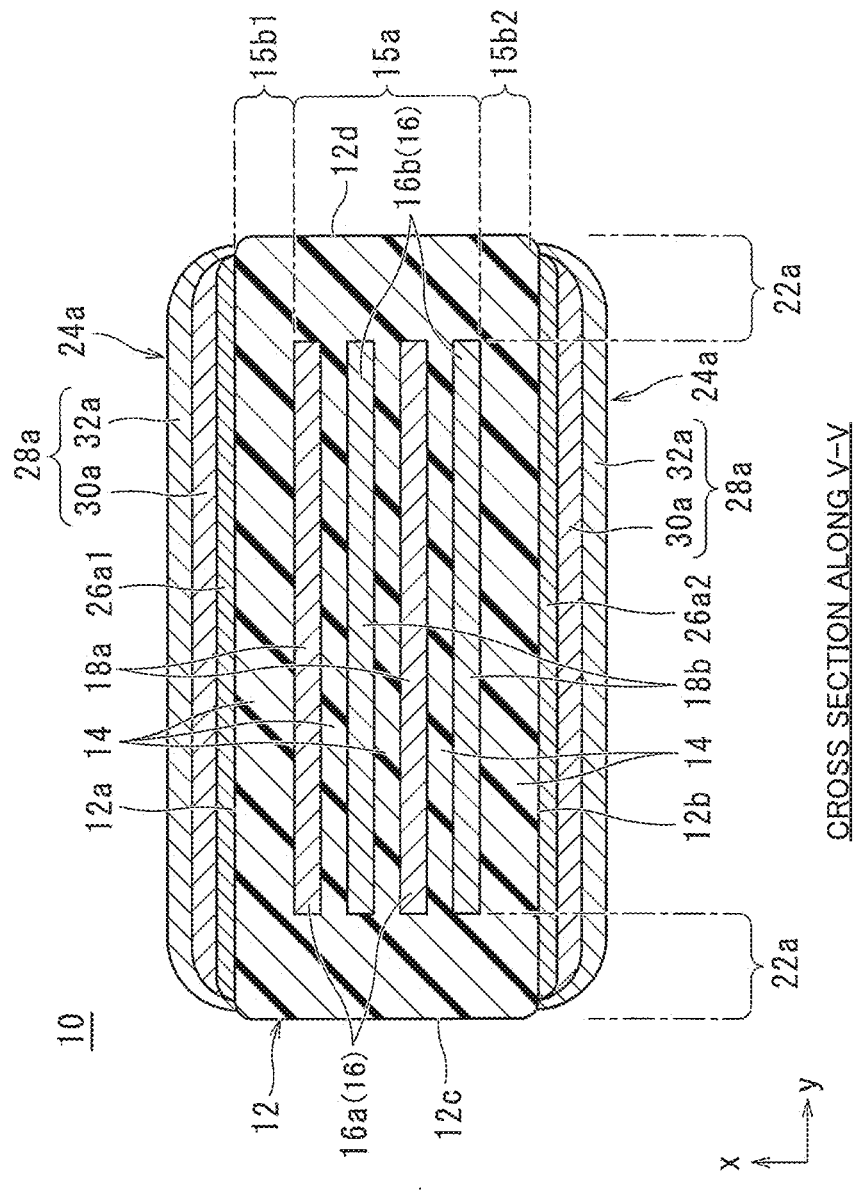
FIG. 5 is a cross section taken along a line V-V indicated in FIG. 1.
Figure 6:
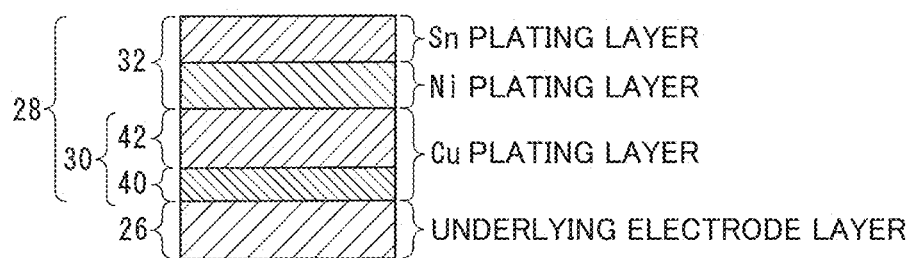
FIG. 6 is a schematic cross section for illustrating a structure of an external electrode according to a preferred embodiment of the present invention.
Figure 7:
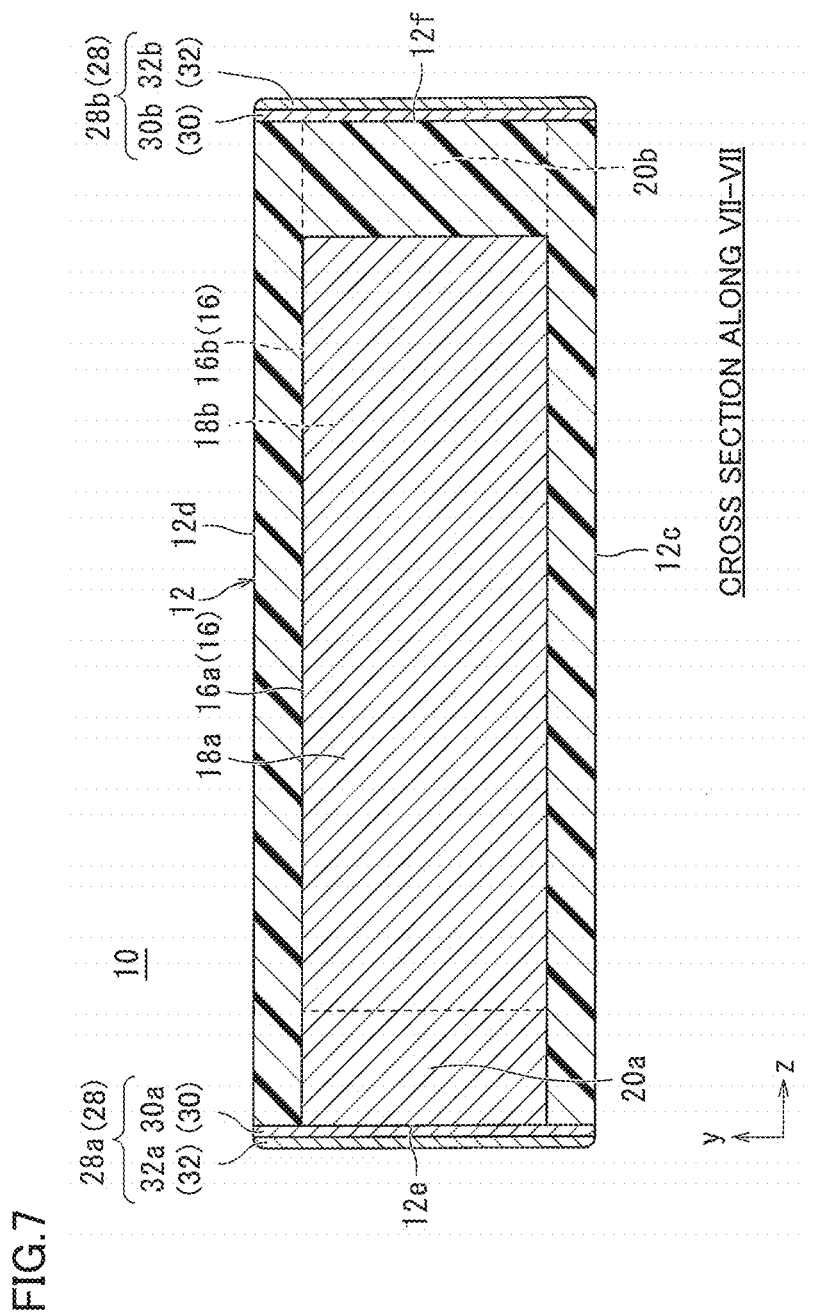
FIG. 7 is a cross section taken along a line VII-VII indicated in FIG. 1.

A multilayer ceramic capacitor 10 which is an example of a multilayer ceramic electronic component according to a first preferred embodiment of the present invention will be described. FIG. 1 is an external perspective view of a multilayer ceramic capacitor as an example of a multilayer ceramic electronic component according to the first preferred embodiment of the present invention. FIG. 2 is a front view of the multilayer ceramic capacitor as the example of the multilayer ceramic electronic component according to the first preferred embodiment of the present invention. FIG. 3 is a top view of the multilayer ceramic capacitor as the example of the multilayer ceramic electronic component according to the first preferred embodiment of the present invention. FIG. 4 is a cross section taken along a line IV-IV indicated in FIG. 1. FIG. 5 is a cross section taken along a line V-V indicated in FIG. 1. FIG. 6 is a schematic cross section for illustrating a structure of an external electrode according to the present invention. FIG. 7 is a cross section taken along a line VII-VII indicated in FIG. 1.

Multilayer ceramic capacitor 10 includes a multilayer body 12 and an external electrode 24. Hereinafter, multilayer body 12 and external electrode 24 will each be described.

Multilayer body 12 includes a plurality of ceramic layers 14 and a plurality of internal electrode layers 16 that are stacked in layers. Further, multilayer body 12 includes a first major surface 12a and a second major surface 12b opposite to each other in a height direction x, a first side surface 12c and a second side surface 12d opposite to each other in a width direction y orthogonal or substantially orthogonal to height direction x, and a first end surface 12e and a second end surface 12f opposite to each other in a length direction z orthogonal or substantially orthogonal to height direction x and width direction y. Multilayer body 12 has rounded corners and ridges. A corner is a portion where three adjacent surfaces of multilayer body 12 meet one another, and a ridge is a portion where two adjacent surfaces of multilayer body 12 meet each other. Further, some or all of first and second major surfaces 12a and 12b, first and second side surfaces 12c and 12d, and first and second end surfaces 12e and 12f may include a recess and a projection or the like, for example.

As shown in FIGS. 4 and 5, in height direction x connecting first major surface 12a and second major surface 12b, multilayer body 12 includes an effective layer portion 15a in which a plurality of internal electrode layers 16 are opposite to one another, a first outer layer portion 15b1 including a plurality of ceramic layers 14 located between an internal electrode layer 16 located closest to first major surface 12a and first major surface 12a, and a second outer layer portion 15b2 including a plurality of ceramic layers 14 located between an internal electrode layer 16 located closest to second major surface 12b and second major surface 12b.

First outer layer portion 15b1 includes a plurality of ceramic layers 14 located on a side of multilayer body 12 closer to first major surface 12a between first major surface 12a and internal electrode layer 16 closest to first major surface 12a.

Second outer layer portion 15b2 includes a plurality of ceramic layers 14 located on a side of multilayer body 12 closer to second major surface 12b between second major surface 12b and internal electrode layer 16 closest to second major surface 12b.

A region sandwiched between first outer layer portion 15b1 and second outer layer portion 15b2 is effective layer portion 15a. While the number of ceramic layers 14 that are stacked is not particularly limited, preferably, for example, 15 or more and 70 or less ceramic layers 14 are stacked including first outer layer portion 15b1 and second outer layer portion 15b2. Ceramic layer 14 preferably has a thickness of about 0.4 μm or more and about 10 μm or less, for example.

Ceramic layer 14 can be made of, for example, a dielectric material. The dielectric material can, for example, be a dielectric ceramic material including $BaTiO_3$, $CaTiO_3$, $SrTiO_3$, $CaZnO_3$ or the like as a main component. Further, the material may include these as a main component and an Mn compound, an Fe compound, a Cr compound, a Co compound, a Ni compound or the like added thereto as a sub-component.

While multilayer body 12 is not particularly limited in dimension, it preferably has, for example, a dimension of about 0.2 mm or more and about 10 mm or less in length direction z, a dimension of about 0.1 mm or more and about 10 mm or less in width direction y, and a dimension of about 30 μm or more and about 200 μm or less in height direction x. In particular, the present preferred embodiment is more effective for multilayer body 12 having a small dimension in height direction x. This is because multilayer body 12 having a smaller dimension in height direction x is reduced in mechanical strength.

As shown in FIGS. 4 and 5, internal electrode layer 16 includes a first internal electrode layer 16a and a second internal electrode layer 16b. First internal electrode layer 16a and second internal electrode layer 16b are alternately stacked with ceramic layer 14 interposed.

First internal electrode layer 16a is disposed on a surface of ceramic layer 14. First internal electrode layer 16a includes a first opposite electrode portion 18a opposite to second internal electrode layer 16b, and a first lead electrode portion 20a located on the side of one end of first internal electrode layer 16a and extending from first opposite electrode portion 18a to first end surface 12e of multilayer body 12. First lead electrode portion 20a includes an end thereof extending to first end surface 12e and thus exposed.

While first opposite electrode portion 18a of first internal electrode layer 16a is not particularly limited in shape, it is preferably rectangular or substantially rectangular in plan view. However, it may have a rounded corner, be provided obliquely in plan view (or tapered), or the like, for example. Alternatively, for example, it may be tapered in plan view such that it is inclined toward either side.

While first lead electrode portion 20a of first internal electrode layer 16a is not particularly limited in shape, it is preferably rectangular or substantially rectangular in plan view. However, it may have a rounded corner, be provided obliquely in plan view (or tapered), or the like, for example. Alternatively, for example, it may be tapered in plan view such that it is inclined toward either side.

First opposite electrode portion 18a of first internal electrode layer 16a and first lead electrode portion 20a of first internal electrode layer 16a may have an equal or substantially equal width, or one of them may have a smaller width than the other.

Second internal electrode layer 16b is disposed on a surface of ceramic layer 14 different from ceramic layer 14 on which first internal electrode layer 16a is disposed. Second internal electrode layer 16b includes a second opposite electrode portion 18b opposite to first internal electrode layer 16a, and a second lead electrode portion 20b located on the side of one end of second internal electrode layer 16b and extending from second opposite electrode portion 18b to second end surface 12f of multilayer body 12. Second lead electrode portion 20b includes an end thereof extending to second end surface 12f and thus exposed.

While second opposite electrode portion 18b of second internal electrode layer 16b is not particularly limited in shape, it is preferably rectangular or substantially rectangular in plan view. However, it may have a rounded corner, be provided obliquely in plan view (or tapered), or the like, for example. Alternatively, for example, it may be tapered in plan view such that it is inclined toward either side.

While second lead electrode portion 20b of second internal electrode layer 16b is not particularly limited in shape, it is preferably rectangular or substantially rectangular in plan view. However, it may have a rounded corner, be provided obliquely in plan view (or tapered), or the like. Alternatively, it may be tapered in plan view such that it is inclined toward either side.

Second opposite electrode layer 18b of second internal electrode layer 16b and second lead electrode portion 20b of second internal electrode layer 16b may have an equal or substantially equal width, or one of them may have a smaller width than the other.

Further, as shown in FIG. 4, multilayer body 12 includes an end portion 22b (hereinafter referred to as an "L gap") of multilayer body 12 between an end portion of first internal electrode layer 16a opposite to first lead electrode portion 20a and second end surface 12f, and between an end portion of second internal electrode layer 16b opposite to second lead electrode portion 20b and first end surface 12e.

As shown in FIG. 5, multilayer body 12 includes a side portion (hereinafter referred to as a "W gap") 22a of multilayer body 12 between one end of each of first and second opposite electrode portions 18a and 18b in width direction y and first side surface 12c, and between the other end of each of first and second opposite electrode portions 18a and 18b in width direction y and second side surface 12d.

First internal electrode layer 16a and second internal electrode layer 16b can be made, for example, of an appropriate conductive material, such as a metal such as for example Ni, Cu, Ag, Pd or Au, or an alloy including at least one of these metals, such as an Ag—Pd alloy. Internal electrode layer 16 may further include dielectric grains having the same or substantially the same composition as a ceramic material included in ceramic layer 14.

When a piezoelectric ceramic material is used for multilayer body 12, the multilayer ceramic electronic component defines and functions as a ceramic piezoelectric element 10a. Specific examples of the piezoelectric ceramic material include a PZT (lead zirconate titanate) based ceramic material and the like.

When a semiconducting ceramic material is used for multilayer body 12, the multilayer ceramic electronic component defines and functions as a thermistor element 10b. Specific examples of the semiconducting ceramic material include a spinel ceramic material and the like.

When a magnetic ceramic material is used for multilayer body 12, the multilayer ceramic electronic component defines and functions as an inductor element 10c. When the multilayer ceramic electronic component defines and functions as the inductor element, the internal electrode layer will be a coil-shaped conductor. Specific examples of the magnetic ceramic material include, for example, a 0 material or the like.

That is, the multilayer ceramic electronic component according to the present preferred embodiment can defines and function suitably not only as multilayer ceramic capacitor 10, but also as ceramic piezoelectric element 10a, thermistor element 10b, or inductor element 10c by appropriately changing multilayer body 12 in material and structure.

Internal electrode layer 16, that is, first internal electrode layer 16a and second internal electrode layer 16b, preferably has a thickness of about 0.2 μm or more and about 2.0 μm or less, for example. A total number of first and second internal electrode layers 16a and 16b is preferably 15 or more and 200 or less layers, for example.

While internal electrode layer 16 may be parallel or substantially parallel to a surface to be mounted on a mounting substrate, or may be perpendicular or substantially perpendicular thereto, it is more preferable that internal electrode layer 16 are parallel or substantially parallel thereto.

As shown in FIGS. 1 to 4, external electrode 24 is disposed on the side of first end surface 12e of multilayer body 12 and on the side of second end surface 12f of multilayer body 12.

External electrode 24 includes an underlying electrode layer 26 and a plating layer 28 covering underlying electrode layer 26.

External electrode 24 includes a first external electrode 24a and a second external electrode 24b.

First external electrode 24a is disposed on multilayer body 12 only at a surface of first end surface 12e, a portion of first major surface 12a, and a portion of second major surface 12b. In this case, first external electrode 24a is electrically connected to first lead electrode portion 20a of first internal electrode layer 16a. Further, first external electrode 24a is not disposed on a portion of first side surface 12c and a portion of second side surface 12d.

Second external electrode 24b is disposed on multilayer body 12 only at a surface of second end surface 12f, a portion of first major surface 12a, and a portion of second major surface 12b. In this case, second external electrode 24b is electrically connected to second lead electrode portion 20b of second internal electrode layer 16b. Further, second external electrode 24b is not disposed on a portion of first side surface 12c and a portion of second side surface 12d.

In multilayer body 12, first opposite electrode portion 18a of first internal electrode layer 16a and second opposite electrode portion 18b of second internal electrode layer 16b are opposite to each other with ceramic layer 14 interposed to generate a capacitance. Therefore, capacitance can be obtained between first external electrode 24a to which first internal electrode layer 16a is connected and second external electrode 24b to which second internal electrode layer 16b is connected, and a capacitor's characteristics are obtained.

Underlying electrode layer 26 includes a first underlying electrode layer 26a1, a second underlying electrode layer 26a2, a third underlying electrode layer 26b1, and a fourth underlying electrode layer 26b2. First underlying electrode layer 26a1, second underlying electrode layer 26a2, third underlying electrode layer 26b1, and fourth underlying electrode layer 26b2 are defined by a thin film layer including a plurality of thin film electrodes to further improve performance.

First underlying electrode layer 26a1 covers multilayer body 12 at a portion of first major surface 12a on the side of first end surface 12e. Second underlying electrode layer 26a2 covers multilayer body 12 at a portion of second major surface 12b on the side of first end surface 12e.

Third underlying electrode layer 26b1 covers multilayer body 12 at a portion of first major surface 12a on the side of second end surface 12f. Fourth underlying electrode layer 26b2 covers multilayer body 12 at a portion of second major surface 12b on the side of second end surface 12f.

Underlying electrode layer 26 defined by the thin film layer is preferably formed in a thin film formation method, such as sputtering or vapor deposition, for example. In particular, underlying electrode layer 26 defined by the thin film layer is preferably a sputtered electrode formed by sputtering. Hereinafter, an electrode formed by sputtering will be described.

When underlying electrode layer 26 is formed by a sputtered electrode, it is preferable to form the sputtered electrode directly on multilayer body 12 at a portion of first major surface 12a and a portion of second major surface 12b.

Underlying electrode layer 26 including the sputtered electrode preferably includes at least one selected from Ni, Cr, Cu, Ti, and the like, for example.

In height direction x connecting first major surface 12a and second major surface 12b, the sputtered electrode preferably has a thickness of, for example, about 50 nm or more and about 400 nm or less, and more preferably about 50 nm or more and about 130 nm or less.

Plating layer 28 includes a first plating layer 28a and a second plating layer 28b. First plating layer 28a covers first underlying electrode layer 26a1 and second underlying electrode layer 26a2. Second plating layer 28b covers third underlying electrode layer 26b1 and fourth underlying electrode layer 26b2.

Plating layer 28 may include a plurality of layers. Preferably, plating layer 28 includes a lower plating layer 30 covering underlying electrode layer 26, and an upper plating layer 32 covering lower plating layer 30. Of plating layer 28, upper plating layer 32 preferably includes, for example, at least one of Ni, Sn, Cu, Ag, Pd, Ag—Pd alloy, Au, and the like.

Lower plating layer 30 includes a first lower plating layer 30a and a second lower plating layer 30b. Lower plating layer 30 is disposed on underlying electrode layer 26 at first end surface 12e and second end surface 12f.

First lower plating layer 30a is disposed on multilayer body 12 at first end surface 12e free of the underlying electrode layer, and further covers first underlying electrode layer 26a1 disposed on first major surface 12a and second underlying electrode layer 26a2 disposed on second major surface 12b.

Second lower plating layer 30b is disposed on multilayer body 12 at second end surface 12f free of the underlying electrode layer, and further covers third underlying electrode layer 26b1 disposed on first major surface 12a and fourth underlying electrode layer 26b2 disposed on second major surface 12b.

This allows a second plating layer (i.e., upper plating layer 32) to have a uniform or substantially uniform thickness and can thus effectively reduce or prevent variation in thickness of the second plating layer (i.e., upper plating layer 32) et. seq.

In the present preferred embodiment, lower plating layer 30 preferably includes metal of Cu, for example. Accordingly, lower plating layer 30 is a Cu plating layer. Lower plating layer 30 is preferably, for example, a Cu plating layer and covers a surface of underlying electrode layer 26 to effectively reduce or prevent penetration by a plating solution.

Further, as shown in FIG. 6, lower plating layer 30 includes a lower layer region 40 located on the side of multilayer body 12 and an upper layer region 42 located between lower layer region 40 and upper plating layer 32.

Further, metal grains of a Cu plating layer located in lower layer region 40 have a smaller grain diameter than that of metal grains of a Cu plating layer located in upper layer region 42. Note that a grain diameter of metal grains of a Cu plating layer means a maximum grain diameter of the Cu plating layer in the direction of the thickness thereof.

Lower plating layer 30 including lower layer region 40 including metal grains having a reduced grain diameter can have a reduced compressive stress as a whole. As a result, even when thermal stress is applied, tensile stress applied to a peripheral portion of lower plating layer 30 can be reduced or prevented, and cracking of multilayer body 12 due to the thermal stress can be reduced or prevented. Further, lower plating layer 30 including upper layer region 42 that includes metal grains having a larger grain diameter than that of metal grains of lower layer region 40 is ensured to be thick and can reduce or prevent penetration of multilayer body 12 by moisture. As a result, satisfactorily reliable resistance to moisture can be maintained while stress caused by application of thermal stress is reduced. Note that while in upper layer region 42 of lower plating layer 30 tensile stress due to thermal stress may be generated since upper layer region 42 includes metal grains having a large grain diameter, lower layer region 40 that includes metal grains having a small diameter define and function as a barrier layer, and can reduce or prevent cracking due to stress caused in upper layer region 42.

The grain diameter of the metal grains of the Cu plating layer located in lower layer region 40 of lower plating layer 30 and the grain diameter of the metal grains of the Cu plating layer located in upper layer region 42 of lower plating layer 30 can be measured with the following method. That is, the grain diameter of the metal grains of the Cu plating layer located in lower layer region 40 of lower plating layer 30 and the grain diameter of the metal grains of the Cu plating layer located in upper layer region 42 of lower plating layer 30 are measured by exposing an LT cross section of multilayer ceramic capacitor 10 at a ½ W position and observing a cross section of lower plating layer 30 with an electron microscope. The cross section is observed preferably with a magnification of about 20,000 times or more, for example. Ten lines are drawn in an observation plane, that is, the cross section of lower plating layer 30, at equal or substantially equal intervals in the direction of the thickness and metal grains on the lines have their maximum grain diameters measured and averaged as the grain diameter of the grains.

Lower layer region 40 of lower plating layer 30 preferably has a smaller thickness than upper layer region 42 of lower plating layer 30. This can reduce compressive stress caused in lower plating layer 30 by application of thermal cycle with respect to multilayer body 12, and effectively reduce or prevent cracking with respect to multilayer body 12 due to the compressive stress.

Lower layer region 40 of lower plating layer 30 preferably has a thickness of, for example, about 0.2 μm or more and about 1.0 μm or less. When lower layer region 40 of lower plating layer 30 has a thickness smaller than about 0.2 μm, lower layer region 40 formed by Cu plating will be discontinuous, and for example, multilayer ceramic capacitor 10 may not be reliably moisture-resistant. In contrast, when lower layer region 40 of lower plating layer 30 has a thickness larger than about 1.0 μm, the external electrode may include an end portion that is formed unsatisfactorily as plating is grown.

Upper layer region 42 of lower plating layer 30 preferably has a thickness of about 4.0 μm or more and about 8.0 μm or less, for example. When upper layer region 42 of lower plating layer 30 has a thickness smaller than about 4.0 μm, upper layer region 42 formed by Cu plating will be discontinuous, and for example, multilayer ceramic capacitor 10 may not be reliably moisture-resistant. In contrast, when upper layer region 42 of lower plating layer 30 has a thickness larger than about 8.0 μm, the elemental body has a thickness reduced by the amount of the thickness of the plating, and capacitance, strength and the like may not be provided as desired.

Lower layer region 40 of lower plating layer 30 preferably includes metal grains having a grain diameter of about 0.20 μm or less, and upper layer region 42 of lower plating layer 30 preferably includes metal grains having a grain diameter of about 0.50 μm or more, for example. Thus, a stress relaxation effect of lower layer region 40 of lower plating layer 30 can reduce compressive stress caused by application of thermal stress with respect to multilayer body 12, and effectively reduce or prevent cracking with respect to multilayer body 12 due to the compressive stress. Further, with the metal grains of upper layer region 42 of lower plating layer 30, an effect is obtained to reduce or prevent unsatisfactory formation of an end portion of the external electrode due to growth of plating. This is because ensuring that lower layer region 40 of lower plating layer 30 is continuous requires providing a thickness of an extent, and in forming a prescribed thickness, using a bath allowing metal grains to be formed with a small grain diameter facilitates growth of plating. When lower layer region 40 of lower plating layer 30 includes metal grains having a grain diameter larger than about 0.20 μm, compressive stress with respect to multilayer body 12 by application of thermal stress increases, and cracking with respect to multilayer body 12 due to the compression stress may occur. In contrast, when upper layer region 42 of lower plating layer 30 includes metal grains having a grain diameter smaller than about 0.5 μm, upper layer region 42 will be discontinuous, and for example, multilayer ceramic capacitor 10 may not be reliably moisture-resistant.

Upper plating layer 32 includes a first upper plating layer 32a and a second upper plating layer 32b.

First upper plating layer 32a covers first lower plating layer 30a. Specifically, first upper plating layer 32a is preferably disposed on a surface of first lower plating layer 30a located on first end surface 12e and also extends to a surface of first lower plating layer 30a on first and second major surfaces 12a and 12b. First upper plating layer 32a may be disposed only on a surface of first lower plating layer 30a located on first end surface 12e.

Second upper plating layer 32b covers second lower plating layer 30b. Specifically, second upper plating layer 32b is preferably disposed on a surface of second lower plating layer 30b located on second end surface 12f and also extends to a surface of second lower plating layer 30b on first and second major surfaces 12a and 12b. Second upper plating layer 32b may be disposed only on a surface of second lower plating layer 30b located on second end surface 12f.

In the present preferred embodiment, upper plating layer 32 has a two-layer structure including a Ni plating layer and a Sn plating layer. The Ni plating layer covers a surface of lower plating layer 30 to prevent underlying electrode layer 26 from being eroded by solder when multilayer ceramic capacitor 10 is mounted on a mounting substrate. The Sn plating layer improves wettability of solder in mounting multilayer ceramic capacitor 10 on the mounting substrate, and thus facilitates mounting multilayer ceramic capacitor 10.

Upper plating layer 32 preferably has, for example, a thickness of about 2 μm or more and about 11 μm or less per layer.

A dimension in length direction z of multilayer ceramic capacitor 10 including multilayer body 12, first external electrode 24a, and second external electrode 24b is indicated as a dimension L, a dimension in height direction x of multilayer ceramic capacitor 10 including multilayer body 12, first external electrode 24a, and second external electrode 24b is indicated as a dimension T, and a dimension in width direction y of multilayer ceramic capacitor 10 including multilayer body 12, first external electrode 24a, and second external electrode 24b is indicated as a dimension W for the sake of illustration. Multilayer ceramic capacitor 10 preferably has, for example, a dimension L in length direction z of about 0.10 mm or more and about 10.0 mm or less, a dimension W in width direction y of about 0.10 mm or more and about 10.0 mm or less, and a dimension T in height direction x of about 20 μm or more and about 10.0 mm or less.

Multilayer ceramic capacitor 10 shown in FIG. 1 that includes lower plating layer 30 that is a Cu plating layer and includes lower layer region 40 including metal grains having a grain diameter smaller than that of metal grains of upper layer region 42 ensures adhesion with multilayer body 12 by underlying electrode layer 26 defined by a thin film layer, and can reduce compressive stress throughout lower plating layer 30 as lower layer region 40 includes metal grains having the smaller grain diameter. As a result, even when thermal stress is applied, tensile stress applied to a peripheral portion of lower plating layer 30 can be reduced or prevented, and cracking of multilayer body 12 due to the thermal stress can be reduced or prevented.

Further, multilayer ceramic capacitor 10 shown in FIG. 1 that includes lower plating layer 30 including upper layer region 42 including metal grains having a larger grain diameter than that of metal grains of lower layer region 40 ensures that lower plating layer 30 is thick, and can reduce or prevent penetration of multilayer body 12 by moisture. As a result, degradation of reliability in resistance to moisture can also be obtained.

2. Exemplary Variation of First Preferred Embodiment

Hereinafter, exemplary variations (first to third exemplary variations) of the multilayer ceramic capacitor that is the multilayer ceramic electronic component according to the first preferred embodiment will be described. For these exemplary variations, components equivalent to those of the above preferred embodiment are denoted by the same reference characters and will not be described in details again.

(1) First Exemplary Variation

Figure 8:
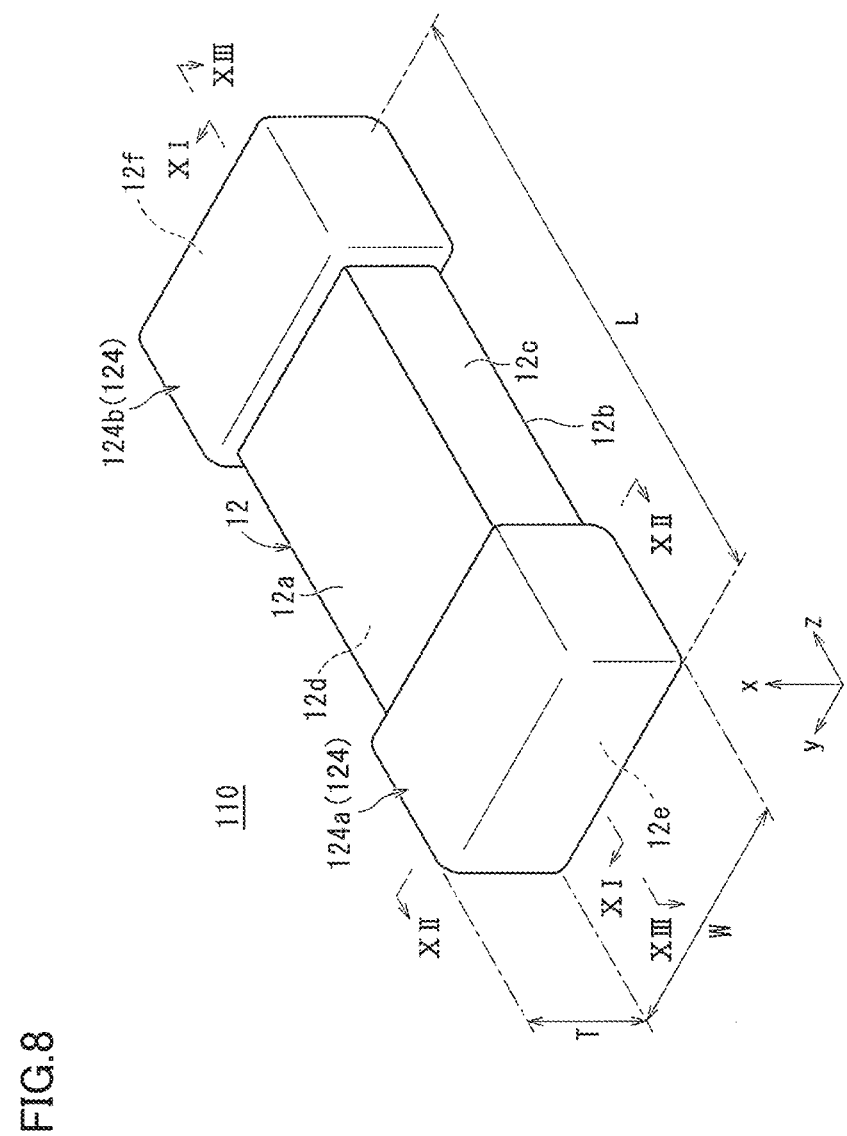
FIG. 8 is an external perspective view of a multilayer ceramic capacitor as an example of a multilayer ceramic electronic component according to a first exemplary variation of the first preferred embodiment of the present invention.
Figure 9:
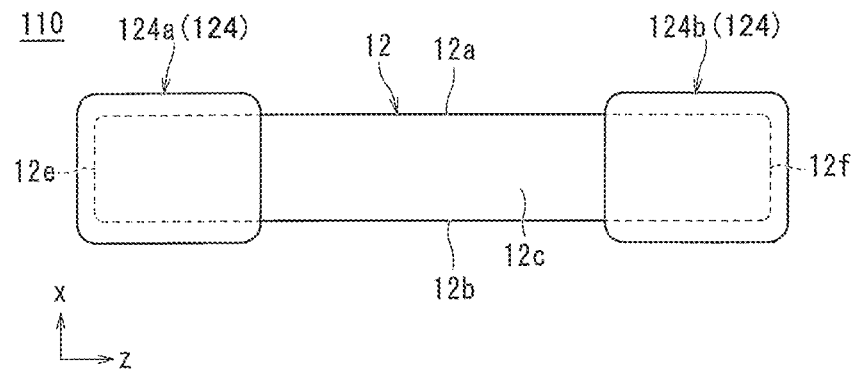
FIG. 9 is a front view of the multilayer ceramic capacitor as the example of the multilayer ceramic electronic component according to the first exemplary variation of the first preferred embodiment of the present invention.
Figure 10:
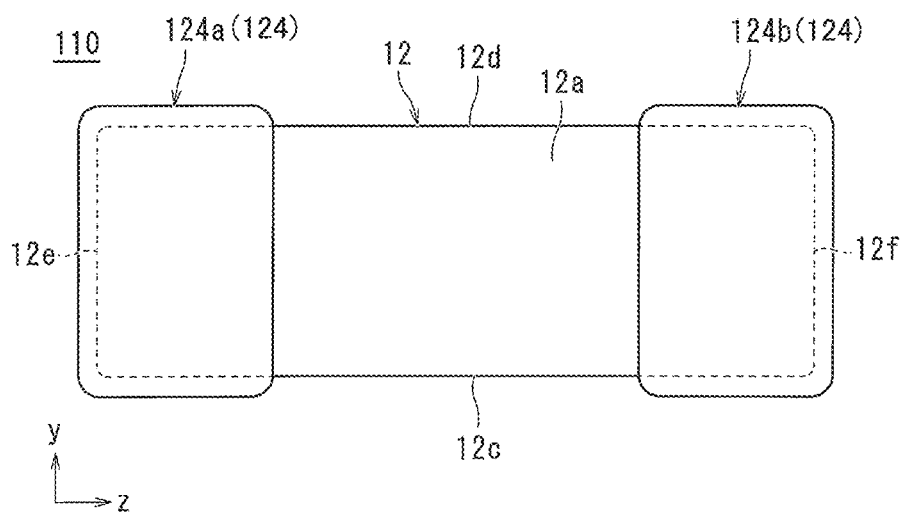
FIG. 10 is a top view of the multilayer ceramic capacitor as the example of the multilayer ceramic electronic component according to the first exemplary variation of the first preferred embodiment of the present invention.
Figure 11:
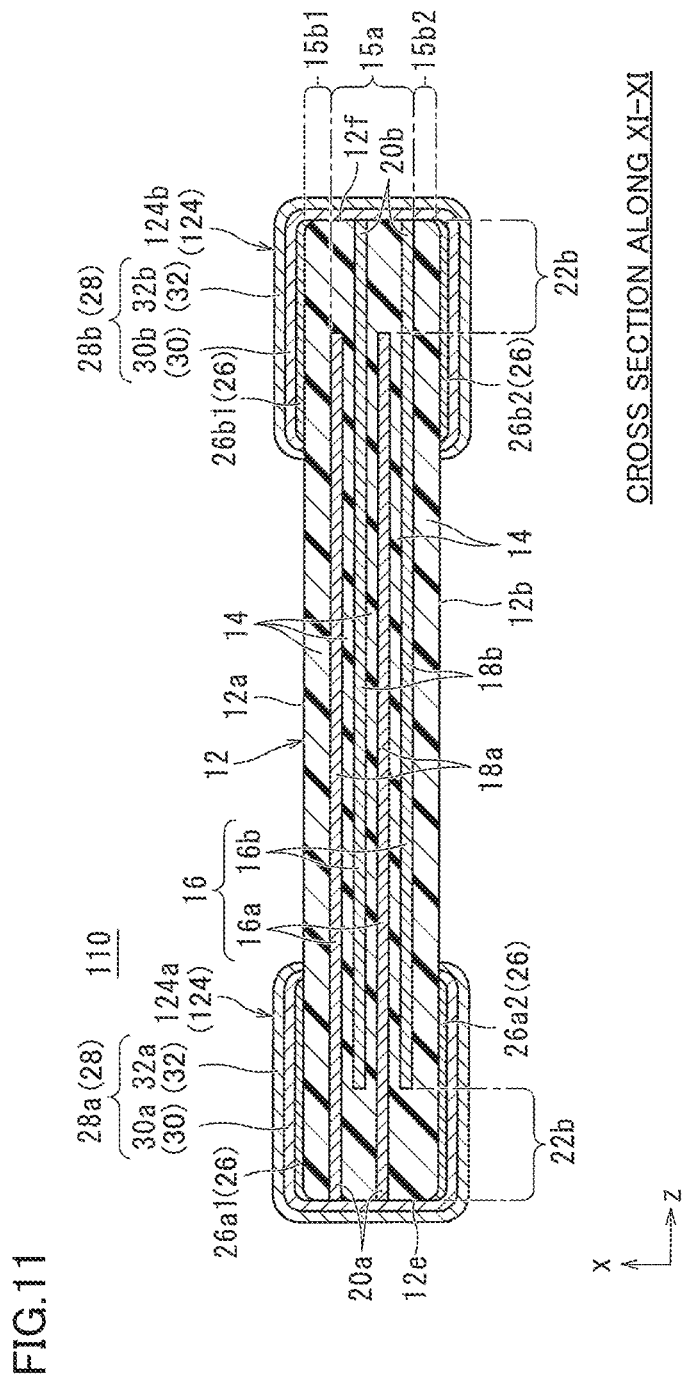
FIG. 11 is a cross section taken along a line XI-XI indicated in FIG. 1.
Figure 12:
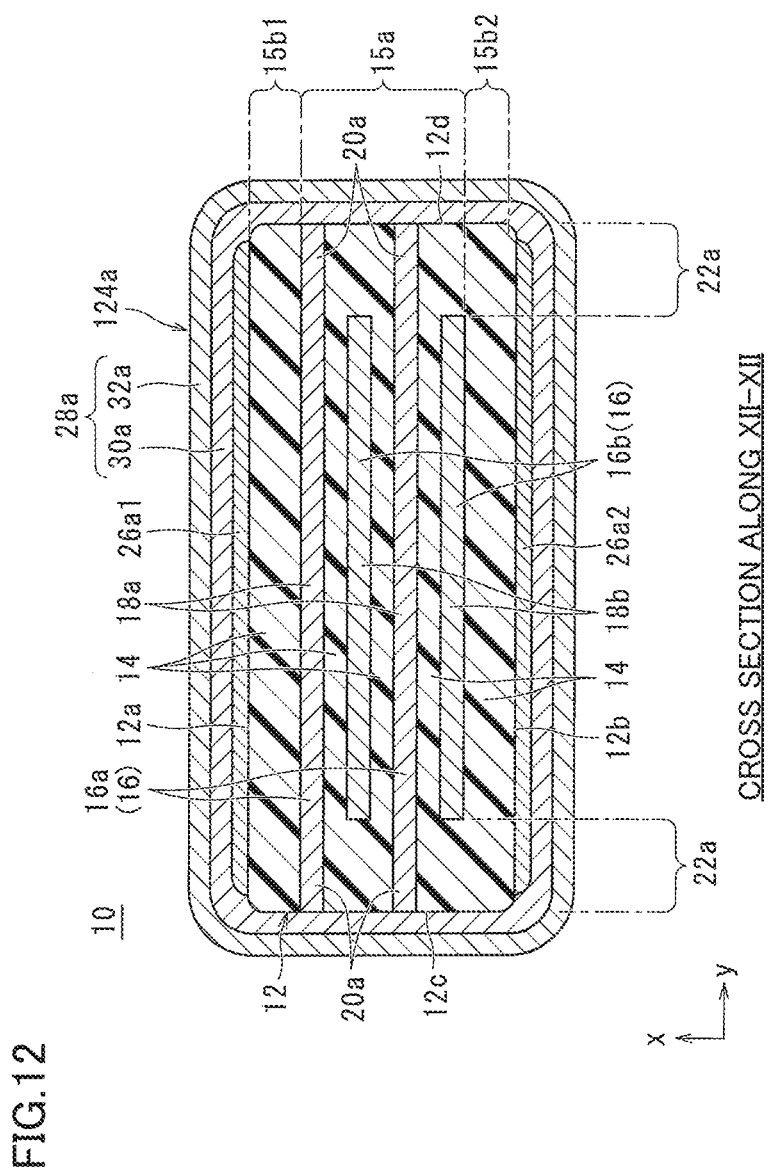
FIG. 12 is a cross section taken along a line XII-XII indicated in FIG. 1.
Figure 13:
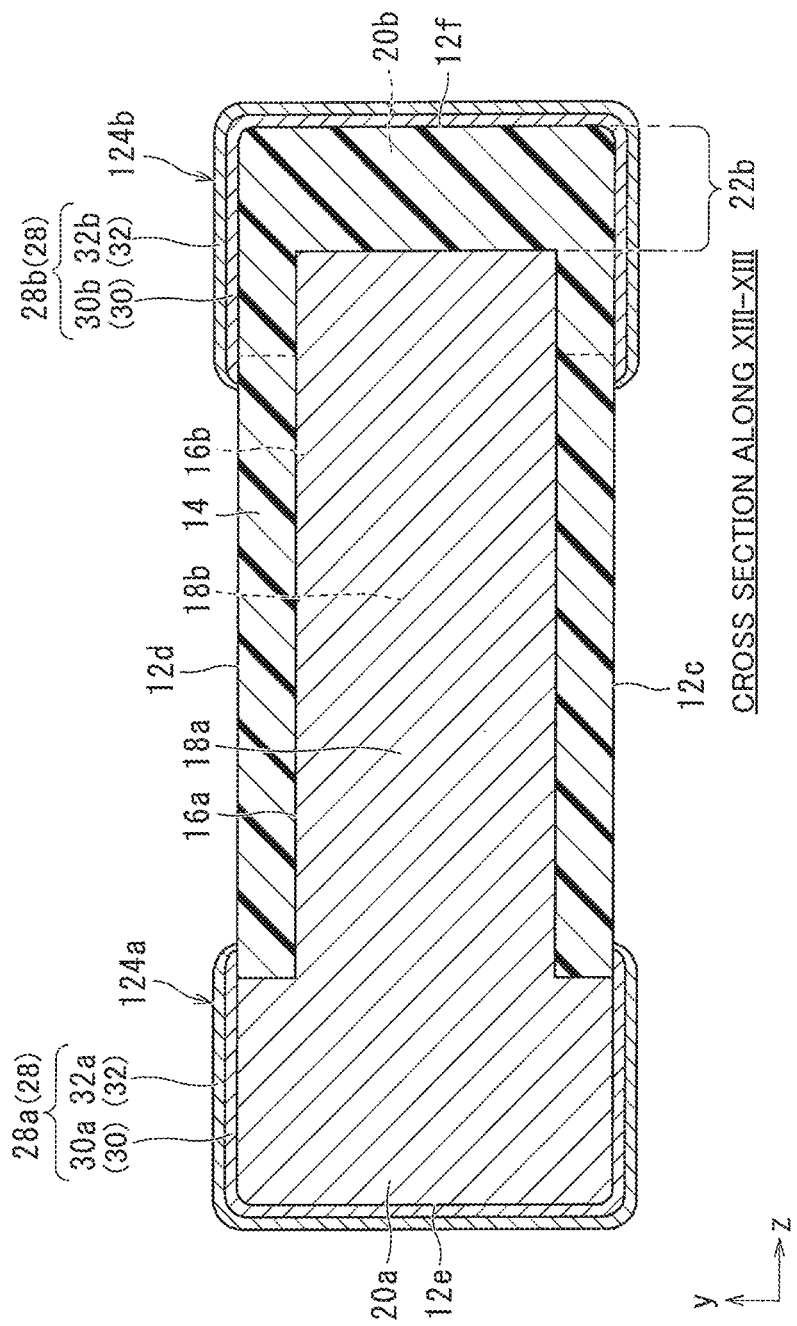
FIG. 13 is a cross section taken along a line XIII-XIII indicated in FIG. 1.

Initially, a multilayer ceramic capacitor 110 that is a multilayer ceramic electronic component according to a first exemplary variation of the first preferred embodiment will be described. FIG. 8 is an external perspective view of a multilayer ceramic capacitor as an example of the multilayer ceramic electronic component according to the first exemplary variation of the first preferred embodiment of the present invention. FIG. 9 is a front view of the multilayer ceramic capacitor as the example of the multilayer ceramic electronic component according to the first exemplary variation of the first preferred embodiment of the present invention. FIG. 10 is a top view of the multilayer ceramic capacitor as the example of the multilayer ceramic electronic component according to the first exemplary variation of the first preferred embodiment of the present invention. FIG. 11 is a cross section taken along a line XI-XI indicated in FIG. 1. FIG. 12 is a cross section taken along a line XII-XII indicated in FIG. 1. FIG. 13 is a cross section taken along a line XIII-XIII indicated in FIG. 1.

In multilayer ceramic capacitor 110 according to the first exemplary variation, as shown in FIG. 8, an external electrode 124 is disposed not on only first end surface 12e, second end surface 12f, first major surface 12a, and second major surface 12b, but also on first side surface 12c and second side surface 12d. Further, as shown in FIG. 13, internal electrode layer 16 includes a lead electrode portion having a different shape.

As shown in FIGS. 11 and 12, internal electrode layer 16 includes first internal electrode layer 16a and second internal electrode layer 16b. First internal electrode layer 16a and second internal electrode layer 16b are alternately stacked with ceramic layer 14 interposed.

First internal electrode layer 16a is disposed on a surface of ceramic layer 14. First internal electrode layer 16a includes first opposite electrode portion 18a opposite to second internal electrode layer 16b, and first lead electrode portion 20a located on the side of one end of first internal electrode layer 16a and extending from first opposite electrode portion 18a to first end surface 12e of multilayer body 12. As shown in FIG. 13, first lead electrode portion 20a includes an end portion extending to first end surface 12e, a portion of first side surface 12c, and a portion of second side surface 12d, and thus exposed.

Second internal electrode layer 16b is disposed on a surface of ceramic layer 14 different from ceramic layer 14 on which first internal electrode layer 16a is disposed. Second internal electrode layer 16b includes second opposite electrode portion 18b opposite to first internal electrode layer 16a, and second lead electrode portion 20b located on the side of one end of second internal electrode layer 16b and extending from second opposite electrode portion 18b to second end surface 12f of multilayer body 12. As shown in FIG. 13, second lead electrode portion 20b includes an end portion extending to second end surface 12f, a portion of first side surface 12c, and a portion of second side surface 12d, and thus exposed.

External electrode 124 includes underlying electrode layer 26 and plating layer 28 covering underlying electrode layer 26.

External electrode 124 includes a first external electrode 124a and a second external electrode 124b.

First external electrode 124a is disposed on multilayer body 12a at a surface of first end surface 12e, a portion of first major surface 12a and a portion of second major surface 12b, and a portion of first side surface 12c and a portion of second side surface 12d. In this case, first external electrode 124a is electrically connected to first lead electrode portion 20a of first internal electrode layer 16a.

Second external electrode 124b is disposed on multilayer body 12 at a surface of second end surface 12f, a portion of first major surface 12a and a portion of second major surface 12b, and a portion of first side surface 12c and a portion of second side surface 12d. In this case, second external electrode 124b is electrically connected to second lead electrode portion 20b of second internal electrode layer 16b.

Further, plating layer 28 of multilayer ceramic capacitor 110 according to the first exemplary variation has the same or substantially the same structure as plating layer 28 of multilayer ceramic capacitor 10.

This enables lower plating layer 30 to also be provided on first and second lead electrode portions 20a and 20b exposed at first and second side surfaces 12c and 12d. As a result, external electrode 124 can also be provided on first side surface 12c and second side surface 12d.

Multilayer ceramic capacitor 110 of the first exemplary variation shown in FIG. 8 achieves advantageous effects that are the same as or similar to that of multilayer ceramic capacitor 10 shown in FIG. 1.

(2) Second Exemplary Variation

Figure 14:
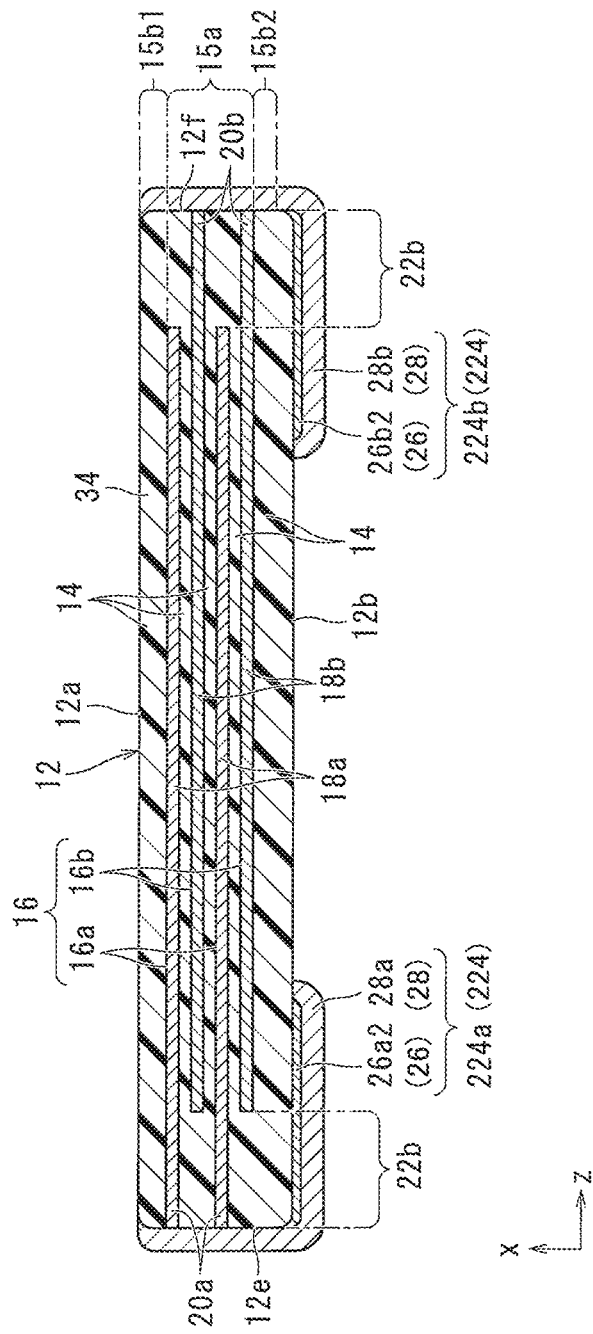
FIG. 14 is a central front cross section of a multilayer ceramic capacitor as an example of a multilayer ceramic electronic component according to a second exemplary variation of the first preferred embodiment of the present invention.

Subsequently, a multilayer ceramic capacitor 210 that is a multilayer ceramic electronic component according to a second exemplary variation of the first preferred embodiment of the present invention will be described. FIG. 14 is a central front cross section of a multilayer ceramic capacitor as an example of the multilayer ceramic electronic component according to the second exemplary variation of the first preferred embodiment of the present invention.

As shown in FIG. 14, multilayer ceramic capacitor 210 according to the second exemplary variation includes an external electrode 224 having an L shape in cross section. External electrode 224 includes a first external electrode 224a and a second external electrode 224b.

In multilayer ceramic capacitor 210 that is a multilayer ceramic electronic component according to the second exemplary variation, as shown in FIG. 14, first external electrode 224a having an L shape in cross section is disposed on a surface of first end surface 12e, and extends from first end surface 12e and is disposed on second major surface 12b. First external electrode 224a may include a portion that wraps around and extends to first major surface 12a.

Further, multilayer ceramic capacitor 210, as shown in FIG. 14, includes a second external electrode 224b having an L shape in cross section disposed on a surface of second end surface 12f, and extending from second end surface 12f and disposed on second major surface 12b. Second external electrode 224b may include a portion that wraps around to extend to first major surface 12a.

Therefore, in multilayer ceramic capacitor 210, on second major surface 12b, only second and fourth underlying electrode layers 26a2 and 26b2 are disposed.

First external electrode 224a may be disposed on first end surface 12e and extend from first end surface 12e to be disposed on first major surface 12a, and second external electrode 224b may be disposed on a surface of second end surface 12f and extend from second end surface 12f to first major surface 12a. First external electrode 224a may include a portion wrapped around to extend to second major surface 12b, and second external electrode 224b may include a portion wrapped around to extend to second major surface 12b. In this case, on first major surface 12a, only the first and third underlying electrode layers are disposed.

Further, plating layer 28 of multilayer ceramic capacitor 210 according to the second exemplary variation has the same or substantially the same structure as plating layer 28 of multilayer ceramic capacitor 10.

Multilayer ceramic capacitor 210 of the second exemplary variation shown in FIG. 14 achieves advantageous effects similar to those of multilayer ceramic capacitor 10 shown in FIG. 1, and also has the following advantageous effects. That is, as external electrode 224 is not provided on a surface of first major surface 12a, multilayer body 12 can have a thickness increased by an amount corresponding to the absence of the thickness of external electrode 224, and multilayer ceramic capacitor 210 can have an improved capacitance per volume. Further, in mounting, solder can be prevented from wetting an upper surface (i.e., first major surface 12a) of multilayer ceramic capacitor 210, and multilayer body 12 can be further increased in thickness accordingly.

(3) Third Exemplary Variation

Figure 15:
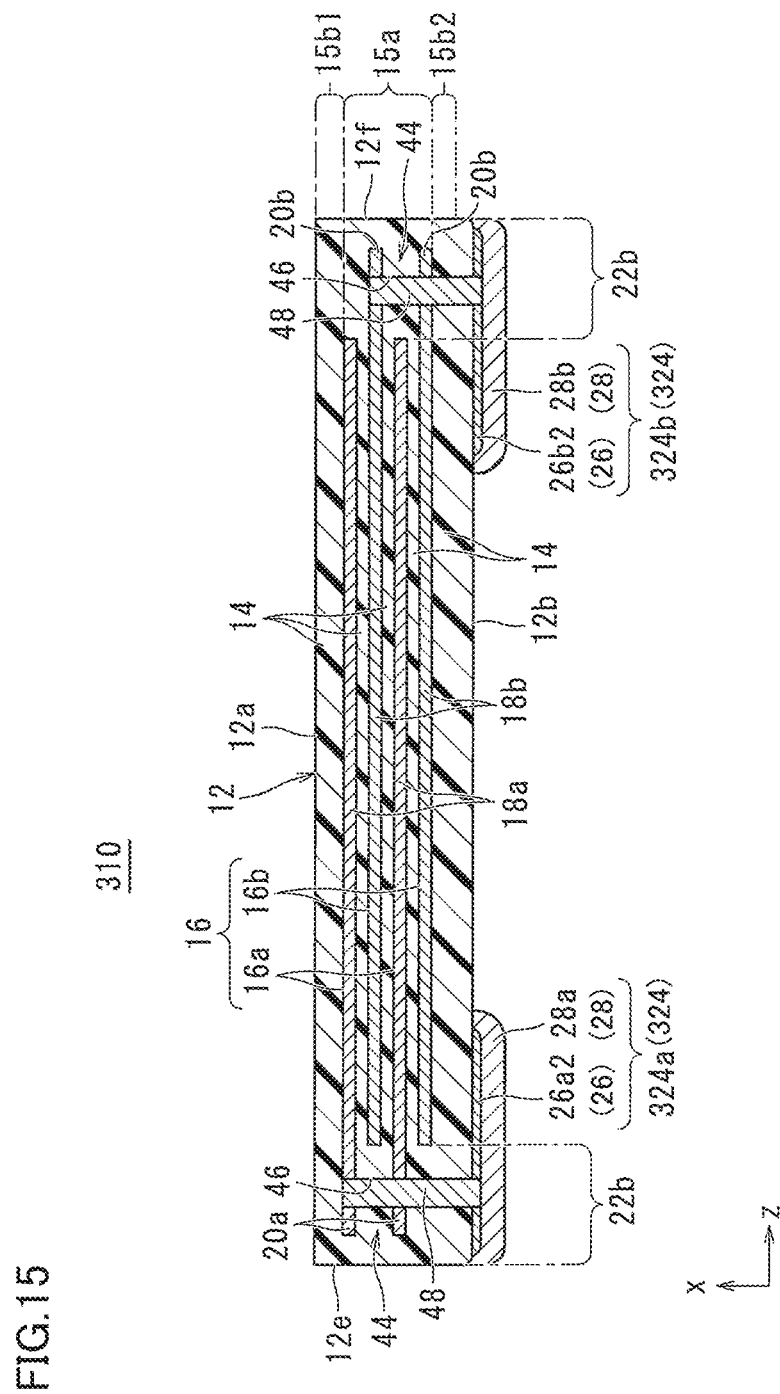
FIG. 15 is a central front cross section of a multilayer ceramic capacitor as an example of a multilayer ceramic electronic component according to a third exemplary variation of the first preferred embodiment of the present invention.

Subsequently, a multilayer ceramic capacitor 310 that is a multilayer ceramic electronic component according to a third exemplary variation of the first preferred embodiment of the present invention will be described. FIG. 15 is a central front cross section of a multilayer ceramic capacitor as an example of the multilayer ceramic electronic component according to the third exemplary variation of the first preferred embodiment of the present invention.

As shown in FIG. 15, multilayer ceramic capacitor 310 according to the third exemplary variation includes an external electrode 324 and a via connection portion 44. External electrode 324 includes a first external electrode 324a and a second external electrode 324b.

In multilayer ceramic capacitor 310 that is a multilayer ceramic electronic component according to the third exemplary variation, as shown in FIG. 15, internal electrode layers 16 are not extending to the opposite end surfaces.

First internal electrode layer 16a includes first opposite electrode portion 18a opposite to second internal electrode layer 16b, and first lead electrode portion 20a located on the side of one end of first internal electrode layer 16a and extending from first opposite electrode portion 18a toward first end surface 12e of multilayer body 12. First lead electrode portion 20a does not include an end thereof extending to first end surface 12e.

Second internal electrode layer 16b includes second opposite electrode portion 18b opposite to first internal electrode layer 16a, and second lead electrode portion 20b located on the side of one end of second internal electrode layer 16b and extending from second opposite electrode portion 18b toward second end surface 12f of multilayer body 12. Second lead electrode portion 20b does not include an end thereof extending to second end surface 12f.

Multilayer ceramic capacitor 310 that is a multilayer ceramic electronic component according to the third exemplary variation, as shown in FIG. 15, includes first external electrode 324a disposed only on second major surface 12b on the side of first end surface 12e that defines and functions as a mounting surface. First external electrode 324a may include a portion wrapped around to extend to first end surface 12e. In this case, as shown in FIG. 15, first external electrode 324a and first lead electrode portion 20a of first internal electrode layer 16a are electrically connected by via connection portion 44.

Further, multilayer ceramic capacitor 310 that is a multilayer ceramic electronic component according to the third exemplary variation, as shown in FIG. 15, includes second external electrode 324b disposed only on second major surface 12b on the side of second end surface 12f that defines and functions as a mounting surface. Second external electrode 324b may include a portion wrapped around to extend to second end surface 12f. In this case, as shown in FIG. 15, second external electrode 324b and second lead electrode portion 20b of second internal electrode layer 16b are electrically connected by via connection portion 44.

Alternatively, the mounting surface may be both first major surface 12a and second major surface 12b. In this case, external electrode 324 is disposed on first major surface 12a and second major surface 12b on the side of first end surface 12e, and is disposed on first major surface 12a and second major surface 12b on the side of second end surface 12f. External electrode 324 may include a portion wrapped around to extend to first end surface 12e and second end surface 12f. In this case as well, internal electrode layer 16 and external electrode 324 are electrically connected by via connection portion 44.

As shown in FIG. 15, via connection portion 44 provides electrical conduction between internal electrode layer 16 and external electrode 324. Via connection portion 44 includes a multilayer body hole 46 extending through multilayer body 12 and a via connection body 48 introduced in multilayer body hole 46 and connected to external electrode 324. First internal electrode layer 16a includes first lead electrode portion 20a electrically connected to first external electrode 324a by via connection body 48. Second internal electrode layer 16b includes second lead electrode portion 20b electrically connected to second external electrode 324b by via connection body 48. Via connection portion 44 is not limited to a circular or substantially circular shape in plan view, and may be a rectangular shape, a polygonal shape, an elliptical shape, or the like, for example, that can provide electrical conduction suitably. Via connection portion 44 on the side of first external electrode 324a and via connection portion 44 on the side of second external electrode 324b may be the same or different.

Multilayer ceramic capacitor 310 of the third exemplary variation shown in FIG. 15 achieves advantageous effects similar to those of multilayer ceramic capacitor 10 shown in FIG. 1, and also achieves the following advantageous effects. That is, as external electrode 324 is not provided on the surfaces of first major surface 12a, and first end surface 12e and second end surface 12f, multilayer body 12 can have a thickness increased by an amount corresponding to the absence of the thickness of external electrode 224, and multilayer ceramic capacitor 310 can have improved capacitance per volume. Further, by reducing a mounting height and furthermore, eliminating fillet, narrowly adjacent mounting can be achieved on the mounting substrate.

While the preferred embodiment of the present invention is disclosed as described above, the present invention is not limited thereto.

3. Method for Manufacturing Multilayer Ceramic Capacitor

Hereinafter, a non-limiting example of a method for manufacturing a multilayer ceramic capacitor that is an example of the multilayer ceramic electronic component according to the first preferred embodiment will be described.

Initially, a ceramic green sheet and a conductive paste for an internal electrode are prepared. A dielectric sheet and the conductive paste for the internal electrode layer include a binder (for example, a known organic binder) and a solvent (for example, a known organic binder).

Subsequently, on the ceramic green sheet, the conductive paste for the internal electrode is printed in a predetermined pattern, for example, by screen-printing, gravure printing or the like to form an internal electrode pattern. Specifically, a paste made of a conductive material is applied to the ceramic green sheet in a method, such as the above-described printing method or the like, for example, to form a conductive paste layer. The paste made of the conductive material includes, for example, powdery metal with an organic binder and an organic solvent added thereto. For the ceramic green sheet, a ceramic green sheet provided for an outer layer and including no internal electrode pattern printed thereon is also prepared.

A multilayer sheet is produced using such ceramic green sheets each having the internal electrode pattern formed thereon. That is, a predetermined number of ceramic green sheets provided for an outer layer and including no internal electrode pattern printed thereon are stacked, a ceramic green sheet on which an internal electrode pattern corresponding to first internal electrode layer 16a is formed and a ceramic green sheet on which an internal electrode pattern corresponding to second internal electrode layer 16b is formed are alternately stacked thereon, and furthermore, a predetermined number of ceramic green sheets provided for an outer layer and including no internal electrode pattern printed thereon are stacked thereon to prepare a multilayer sheet.

Further, the multilayer sheet is pressed in the layer stacking direction by, for example, hydrostatic pressing to prepare a multilayer block.

Subsequently, the multilayer block is cut into a predetermined size to cut out a multilayer chip. The multilayer chip may be barreled or the like, for example to round a corner and a ridge.

Subsequently, the multilayer chip is fired to produce multilayer body 12. The firing temperature is preferably about 900° C. or higher and about 1400° C. or lower, for example, although it depends on the ceramic material and the material(s) of the internal electrode.

Subsequently, underlying electrode layer 26 made of a thin film layer is formed on multilayer body 12 at a portion of first major surface 12a and a portion of second major surface 12b. Underlying electrode layer 26 that is a thin film layer can be formed, for example, by sputtering or the like. In other words, underlying electrode layer 26 that is a thin film layer is configured as a sputtered electrode. The sputtered electrode can be formed of a metal including at least one selected from Ni, Cr, Cu, Ti, and the like, for example.

Thereafter, a Cu plating layer as lower plating layer 30 is formed so as to directly cover underlying electrode layer 26 made of a thin film layer, and multilayer body 12 on first and second end surfaces 12e and 12f on which underlying electrode layer 26 is not disposed. To form lower plating layer 30, for example, electroplating using an electroplating bath with an additive added thereto or electroless plating by substitution reaction is performed. By changing a plating condition, lower layer region 40 located on the side of multilayer body 12 and upper layer region 42 located on a surface of lower layer region 40 are formed in lower plating layer 30. The plating condition includes, for example, bath temperature, bath ion concentration, and current density for electrolytic plating. Thus, lower layer region 40 can be formed of metal grains having a grain diameter smaller than that of metal grains configuring upper layer region 42.

Subsequently, upper plating layer 32 is formed on a surface of lower plating layer 30. Upper plating layer 32 includes, for example, at least one selected from Cu, Ni, Sn, Ag, Pd, Ag—Pd alloy, Au, and the like, and is formed of a single layer or a plurality of layers. Preferably, upper plating layer 32 includes a Ni plating layer and a Sn plating layer formed on the Ni plating layer, and is thus including two layers.

Multilayer ceramic capacitor 10 shown in FIG. 1 can thus be manufactured.

The method for manufacturing a multilayer ceramic capacitor according to the present preferred embodiment as described above enables a multilayer ceramic capacitor according to the present preferred embodiment which provides high performance to be manufactured with high quality.

B. Second Preferred Embodiment

1. Multilayer Ceramic Capacitor

Figure 16:
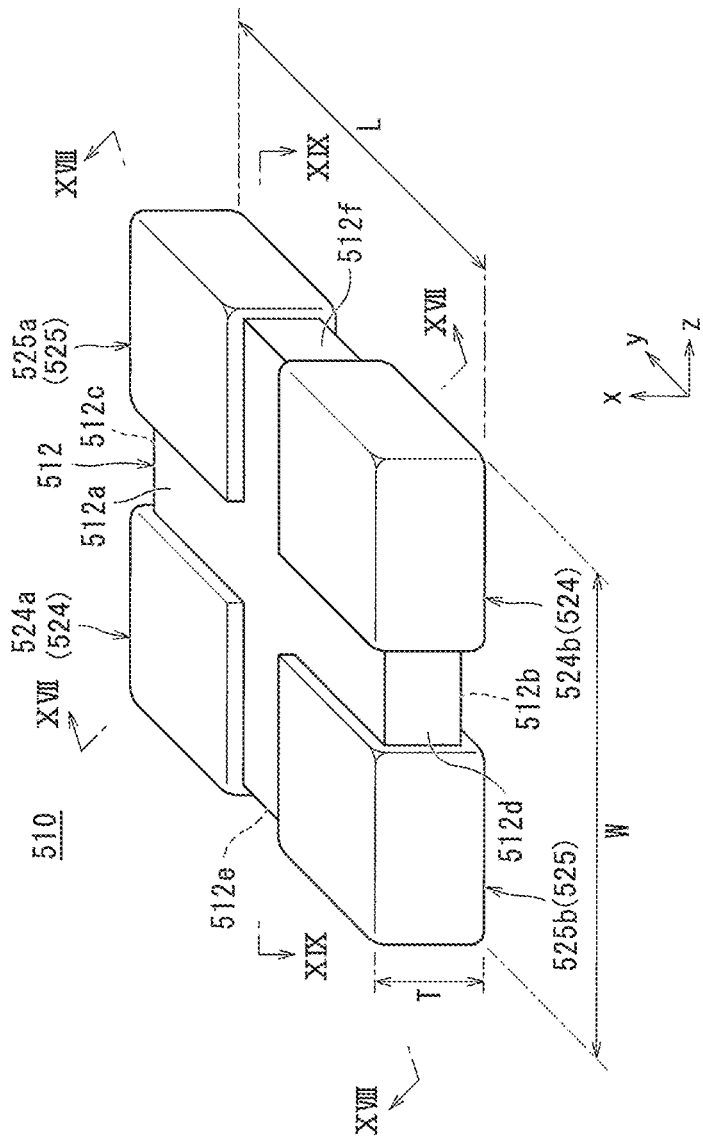
FIG. 16 is an external perspective view of a multilayer ceramic capacitor as an example of a multilayer ceramic electronic component according to a second preferred embodiment of the present invention.
Figure 17:
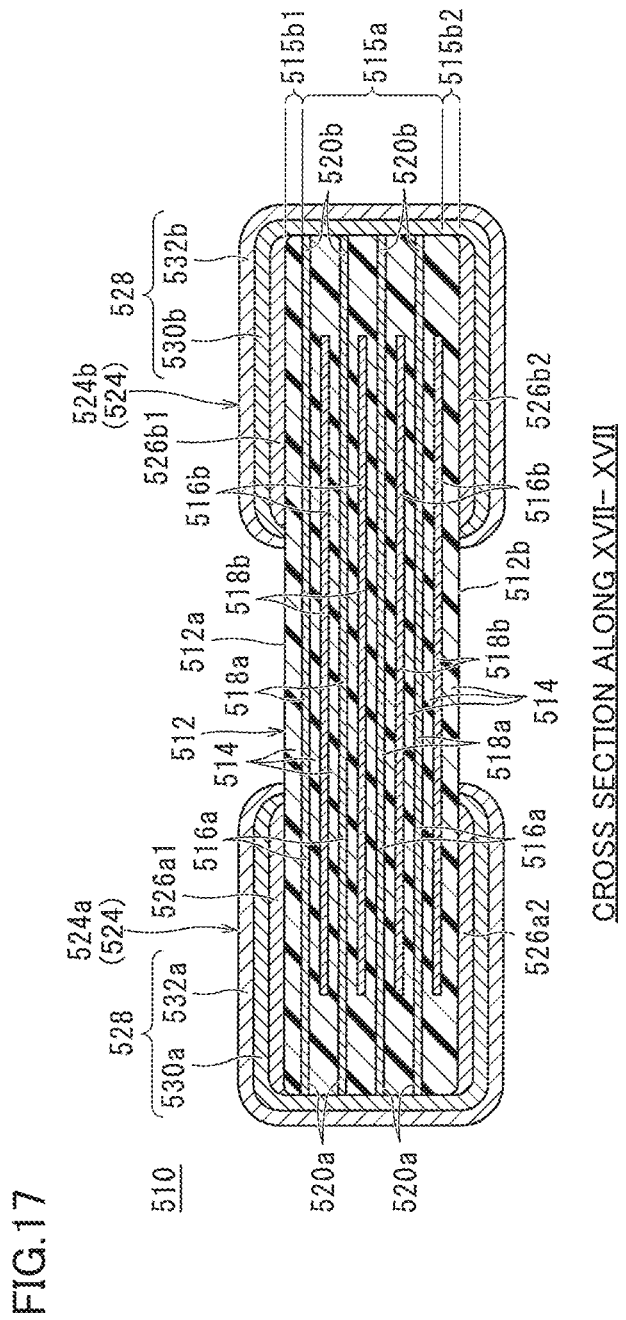
FIG. 17 is a cross section taken along a line XVII-XVII indicated in FIG. 16.
Figure 18:
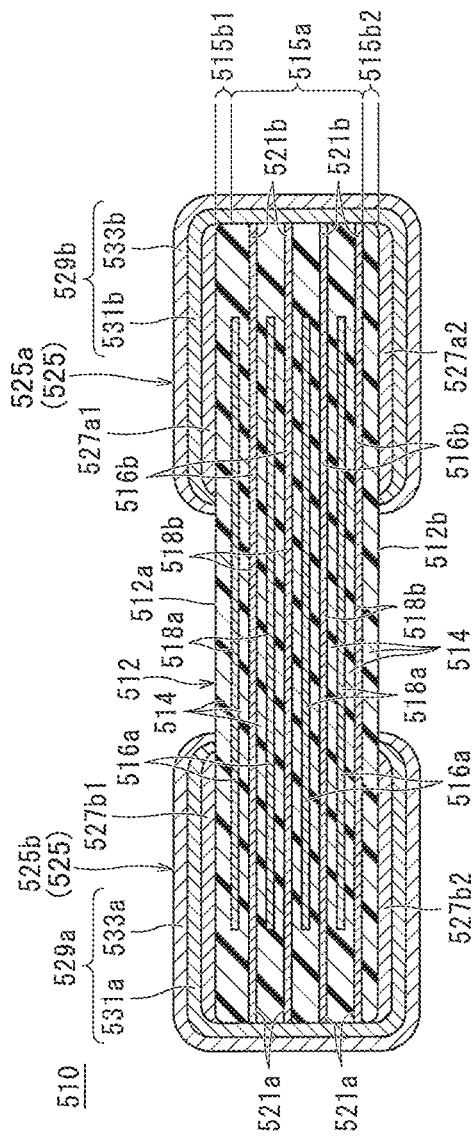
FIG. 18 is a cross section taken along a line XVIII-XVIII indicated in FIG. 16.
Figure 19:
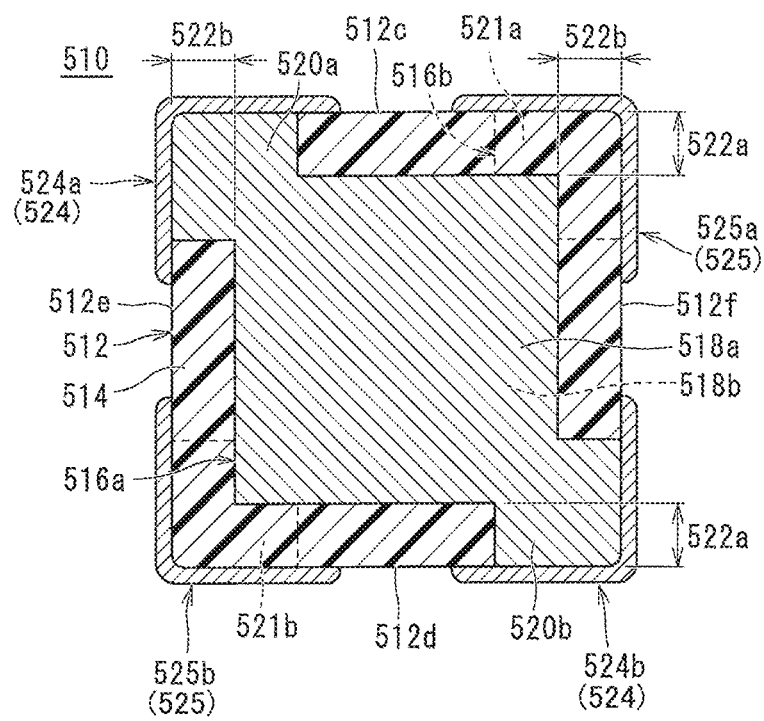
FIG. 19 is a cross section taken along a line XIX-XIX indicated in FIG. 16.
Figure 20:
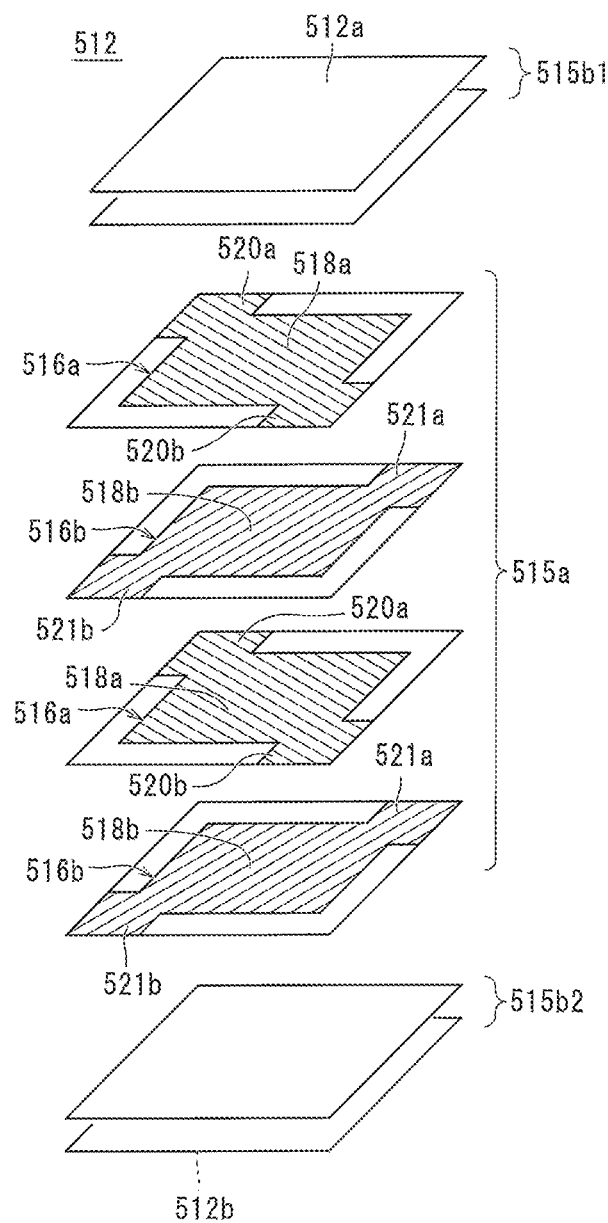
FIG. 20 is an exploded perspective view of a multilayer body shown in FIG. 16.
Figure 21A:
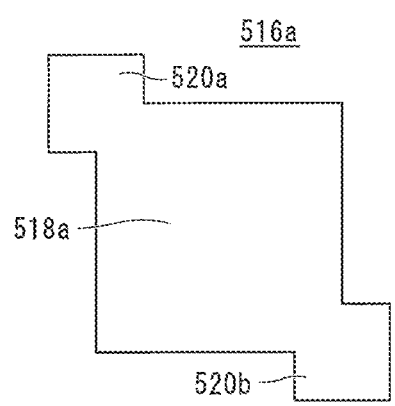
FIG. 21A shows a first internal electrode pattern of the multilayer ceramic capacitor shown in FIG. 16.
Figure 21B:
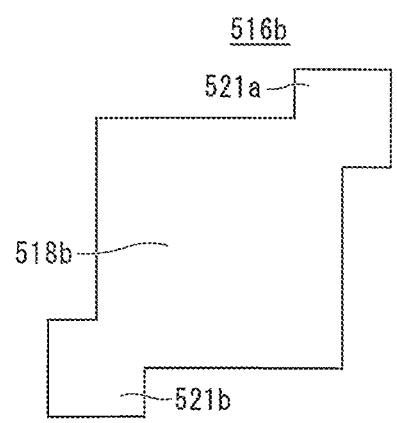
FIG. 21B shows a second internal electrode pattern of the multilayer ceramic capacitor shown in FIG. 16.
Figure 22:
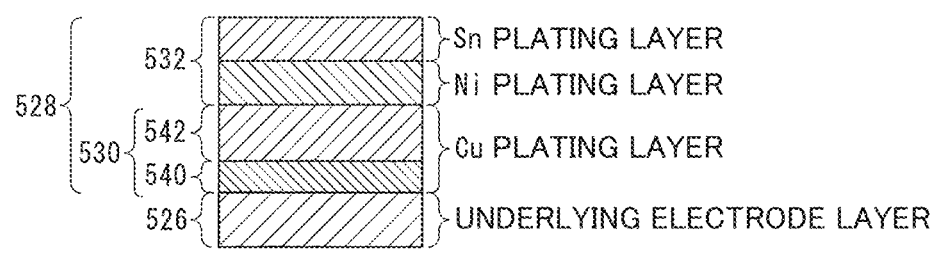
FIG. 22 is a schematic cross section for illustrating a structure of an external electrode according to a preferred embodiment of the present invention.
Figure 23:
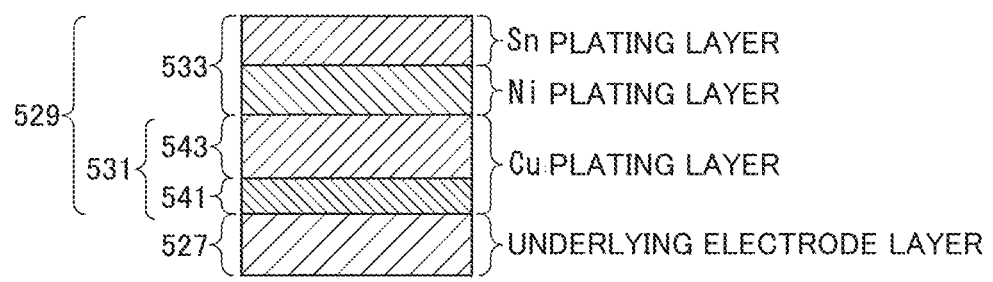
FIG. 23 is a schematic cross section for illustrating a structure of an external electrode according to a preferred embodiment of the present invention.

Hereinafter, a multilayer ceramic capacitor according to a second preferred embodiment of the present invention will be described. FIG. 16 is an external perspective view of a multilayer ceramic capacitor as an example of the multilayer ceramic electronic component according to the second preferred embodiment of the present invention. FIG. 17 is a cross section taken along a line XVII-XVII indicated in FIG. 16. FIG. 18 is a cross section taken along a line XVIII-XVIII indicated in FIG. 16. FIG. 19 is a cross section taken along a line XIX-XIX indicated in FIG. 16. FIG. 20 is an exploded perspective view of a multilayer body shown in FIG. 16. FIG. 21A shows a first internal electrode pattern of the multilayer ceramic capacitor shown in FIG. 16. FIG. 21B shows a second internal electrode pattern of the multilayer ceramic capacitor shown in FIG. 16. FIG. 22 is a schematic cross section for illustrating a structure of an external electrode according to the present invention. FIG. 23 is a schematic cross section for illustrating a structure of an external electrode according to the present invention.

A multilayer ceramic capacitor 510 includes a multilayer body 512 and external electrodes 524 and 525.

Multilayer body 512 includes a plurality of ceramic layers 514 and a plurality of internal electrode layers 516. Multilayer body 512 includes a first major surface 512a and a second major surface 512b opposite to each other in height direction x, a first side surface 512c and a second side surface 512d opposite to each other in width direction y orthogonal or substantially orthogonal to height direction x, and a third end surface 512e and a fourth end surface 512f opposite to each other in length direction z orthogonal or substantially orthogonal to height direction x and width direction y. First major surface 512a and second major surface 512b each extend in width direction y and length direction z. First side surface 512c and second side surface 512d each extend in height direction x and width direction z. Third side surface 512e and fourth side surface 512f each extend in height direction x and length direction y. Accordingly, height direction x is a direction connecting first major surface 512a and second major surface 512b, width direction y is a direction connecting first side surface 512c and second side surface 512d, and length direction z is a direction connecting third side surface 512e and fourth side surface 512f.

Multilayer body 512 preferably includes a corner and a ridge that are rounded. A corner is a portion where three surfaces of multilayer body 512 meet one another, and a ridge is a portion where two surfaces of multilayer body 512 meet each other.

As shown in FIGS. 17 and 18, in height direction x connecting first major surface 512a and second major surface 512b, multilayer body 512 includes an effective layer portion 515a in which the plurality of internal electrode layers 516 are opposite to one other, a first outer layer portion 515b1 including a plurality of ceramic layers 514 located between an internal electrode layer 516 located closest to first major surface 512a and first major surface 512a, and a second outer layer portion 515b2 including a plurality of ceramic layers 514 located between an internal electrode layer 516 located closest to second major surface 512b and second major surface 512b.

First outer layer portion 515b1 includes a plurality of ceramic layers 514 located on a side of multilayer body 512 closer to first major surface 512a between first major surface 512a and internal electrode layer 516 closest to first major surface 512a.

Second outer layer portion 515b2 includes a plurality of ceramic layers 514 located on a side of multilayer body 512 closer to second major surface 512*b* between second major surface 512*b* and internal electrode layer 516 closest to second major surface 512*b*.

A region sandwiched between first outer layer portion 515*b*1 and second outer layer portion 515*b*2 is effective layer portion 515*a*. While the number of ceramic layers 514 that are stacked is not particularly limited, preferably, for example, 15 or more and 70 or less ceramic layers 514 are stacked including first outer layer portion 515*b*1 and second outer layer portion 515*b*2. Ceramic layer 514 preferably has a thickness of, for example, about 0.4 μm or more and about 10 μm or less. First outer layer portion 515*b*1 and second outer layer portion 515*b*2 preferably have a thickness of, for example, about 3 μm or more and about 15 μm or less. A region sandwiched between both outer layer portions 515*b*1 and 515*b*2 is effective layer portion 515*a*. That is, effective layer portion 515*a* is a region in which internal electrode layers 516 are stacked.

Ceramic layer 514 can be made of, for example, a dielectric material. The dielectric material can, for example, be a dielectric ceramic material including $BaTiO_3$, $CaTiO_3$, $SrTiO_3$, $CaZnO_3$ or the like as a main component. Further, the material may include these as a main component and an Mn compound, an Fe compound, a Cr compound, a Co compound, a Ni compound or the like added thereto as a subcomponent.

While multilayer body 512 is not particularly limited in dimension, for example, it preferably has a dimension L of about 0.43 mm or more and about 0.73 mm or less, about 0.85≤W/L≤about 1.0, and a dimension T of about 50 μm or more and about 5 90 μm or less.

As shown in FIGS. 17 to 20, internal electrode layer 516 includes a plurality of first internal electrode layers 516*a* and a plurality of second internal electrode layers 516*b*. First internal electrode layer 516*a* and second internal electrode layer 516*b* are alternately stacked with ceramic layer 514 interposed therebetween.

First internal electrode layer 516*a* is disposed on a surface of ceramic layer 514. First internal electrode layer 516*a* includes a first opposite electrode portion 518*a* opposite to first major surface 512*a* and second major surface 512*b* and opposite to second internal electrode layer 516*b*, and is stacked in a direction connecting first major surface 512*a* and second major surface 512*b*.

Second internal electrode layer 516*b* is disposed on a surface of a ceramic layer 514 different from ceramic layer 514 on which first internal electrode layer 516*a* is disposed. Second internal electrode layer 516*b* includes a second opposite electrode portion 518*b* opposite to first major surface 512*a* and second major surface 512*b*, and is stacked in a direction connecting first major surface 512*a* and second major surface 512*b*.

As shown in FIGS. 19 to 21B, first internal electrode layer 516*a* is extending to first and third side surfaces 512*c* and 512*e* of multilayer body 512 by a first lead electrode portion 520*a*, and is extending to second and fourth side surfaces 512*d* and 512*f* of multilayer body 512 by a second lead electrode portion 520*b*. A width of first lead electrode portion 520*a* extending to first side surface 512*c* may be equal or substantially equal to that of first lead electrode portion 520*a* extending to third side surface 512*e*, and a width of second lead electrode portion 520*b* extending to second side surface 512*d* may be equal or substantially equal to that of second lead electrode portion 520*b* extending to fourth side surface 512*f*. That is, first lead electrode portion 520*a* is extending to the side of third side surface 512*e* of multilayer body 512, and second lead electrode portion 520*b* is extending to the side of fourth side surface 512*f* of multilayer body 512.

Second internal electrode layer 516*b* is extending to first and fourth side surfaces 512*c* and 512*f* of multilayer body 512 by a third lead electrode portion 521*a*, and is extending to second and third side surfaces 512*d* and 512*e* of multilayer body 512 by a fourth lead electrode portion 521*b*. A width of third lead electrode portion 521*a* extending to first side surface 512*c* may be equal or substantially equal to that of third lead electrode portion 521*a* extending to fourth side surface 512*f*, and a width of fourth lead electrode portion 521*b* extending to second side surface 512*d* may be equal or substantially equal to that of fourth lead electrode portion 521*b* extending to third side surface 512*e*. That is, third lead electrode portion 521*a* is extending to the side of fourth side surface 512*f* of multilayer body 512, and fourth lead electrode portion 521*b* is extending to the side of third side surface 512*c* of multilayer body 512.

When multilayer ceramic capacitor 510 is seen in the layer stacking direction, it is preferable that a straight line connecting first and second lead electrode portions 520*a* and 520*b* of first internal electrode layer 516*a* and a straight line connecting third and fourth lead electrode portions 521*a* and 521*b* of second internal electrode layer 516*b* intersect with each other.

Further, it is preferable that, at side surfaces 512*c*, 512*d*, 512*e* and 512*f* of multilayer body 512, first lead electrode portion 520*a* of first internal electrode layer 516*a* and fourth lead electrode portion 521*b* of second internal electrode layer 516*b* extend to locations opposite to each other, and second lead electrode portion 520*b* of first internal electrode layer 516*a* and third lead electrode portion 521*a* of second internal electrode layer 516*b* extend to locations opposite to each other.

As shown in FIG. 19, multilayer body 512 includes a side portion (an L gap) 522*b* of multilayer body 512 between one end in length direction z of first opposite electrode portion 518*a* and third side surface 512*e* and between the other end in length direction z of second opposite electrode portion 518*b* and fourth side surface 512*f*. Multilayer body 512 preferably includes side portion (or L gap) 522*b* with an average length in width direction z of, for example, about 10 μm or more and about 60 μm or less, more preferably about 10 μm or more and about 30 μm or less, and still more preferably about 10 μm or more and about 20 μm or less.

Further, as shown in FIG. 19, multilayer body 512 includes a side portion (a W gap) 522*a* of multilayer body 512 between one end in width direction y of first opposite electrode portion 518*a* and first side surface 512*c*, and between the other end in width direction y of second opposite electrode portion 518*b* and second side surface 512*d*. Multilayer body 512 preferably has side portion (or W gap) 522*a* with an average length in length direction y of, for example, about 10 μm or more and about 60 μm or less, more preferably about 10 μm or more and about 30 μm or less, and still more preferably about 10 μm or more and about 20 μm or less.

Internal electrode layer 516 can be made of material including, for example, metal such as Ni, Cu, Ag, Pd, Au or the like, or an alloy including one of these metals, such as an Ag—Pd alloy. Internal electrode layer 516 may further include dielectric grains having the same or substantially the same composition as a ceramic material included in ceramic layer 514. Preferably, for example, 20 or more and 80 or less internal electrode layers 516 are stacked. Internal electrode layers 516 preferably have an average thickness of, for example, about 0.2 μm or more and about 2.0 μm or less.

As shown in FIGS. 16 to 19, external electrodes 524 and 525 are disposed on multilayer body 512.

External electrode 524 includes an underlying electrode layer 526 and a plating layer 528 covering underlying electrode layer 526. External electrode 525 includes an underlying electrode layer 527 and a plating layer 529 covering underlying electrode layer 527.

External electrode 524 includes a first external electrode 524a and a second external electrode 524b.

First external electrode 524a covers first lead electrode portion 520a on first side surface 512c and third side surface 512e, and covers a portion of first and second major surfaces 512a and 512b. First external electrode 524a is electrically connected to first lead electrode portion 520a of first internal electrode layer 516a.

Second external electrode 524b covers second lead electrode portion 520b on second side surface 512d and fourth side surface 512f, and covers a portion of first and second major surfaces 512a and 512b. Second external electrode 524b is electrically connected to second lead electrode portion 520b of first internal electrode layer 516a.

External electrode 525 includes a third external electrode 525a and a fourth external electrode 525b.

Third external electrode 525a covers third lead electrode portion 521a on first side surface 512c and fourth side surface 512f, and covers a portion of first and second major surfaces 512a and 512b. Third external electrode 525a is electrically connected to third lead electrode portion 521a of second internal electrode layer 516b.

Fourth external electrode 525b covers fourth lead electrode portion 521b on second side surface 512d and third side surface 512e, and covers a portion of first and second major surfaces 512a and 512b. Fourth external electrode 525b is electrically connected to fourth lead electrode portion 521b of second internal electrode layer 516b.

In multilayer body 512, first opposite electrode portion 518a of first internal electrode layer 516a and second opposite electrode portion 518b of second internal electrode layer 516b are opposite to each other with ceramic layer 514 interposed therebetween to generate capacitance. Therefore, capacitance can be obtained between first and second external electrodes 524a and 524b to which first internal electrode layer 516a is connected and third and fourth external electrodes 525a and 525b to which second internal electrode layer 516b is connected, and capacitor characteristics are produced.

Underlying electrode layer 526 includes a first underlying electrode layer 526a1, a second underlying electrode layer 526a2, a third underlying electrode layer 526b1, and a fourth underlying electrode layer 526b2. First underlying electrode layer 526a1, second underlying electrode layer 526a2, third underlying electrode layer 526b1, and fourth underlying electrode layer 526b2 are defined by a thin film layer including a plurality of thin film electrodes to further improve performance.

First underlying electrode layer 526a1 covers a portion of first major surface 512a at a corner where first major surface 512a, first side surface 512c, and third side surface 512e meet one another. Second underlying electrode layer 526a2 covers a portion of second major surface 512b at a corner where second major surface 512b, first side surface 512c, and third side surface 512e meet one another. Third underlying electrode layer 526b1 covers a portion of first major surface 512a at a corner where first major surface 512a, second side surface 512d, and fourth side surface 512f meet one another. Fourth underlying electrode layer 526b2 covers a portion of second major surface 512b at a corner where second major surface 512b, second side surface 512d, and fourth side surface 512f meet one another.

Underlying electrode layer 527 includes a fifth underlying electrode layer 527a1, a sixth underlying electrode layer 527a2, a seventh underlying electrode layer 527b1, and an eighth underlying electrode layer 527b2. Fifth underlying electrode layer 527a1, sixth underlying electrode layer 527a2, seventh underlying electrode layer 527b1, and eighth underlying electrode layer 527b2 are each defined by a thin film layer including a plurality of thin film electrodes for further enhanced performance.

Fifth underlying electrode layer 527a1 covers a portion of first major surface 512a at a corner where first major surface 512a, first side surface 512c, and fourth side surface 512f meet one another. Sixth underlying electrode layer 527a2 covers a portion of second major surface 512b at a corner where second major surface 512b, first side surface 512c, and fourth side surface 512f meet one another. Seventh underlying electrode layer 527b1 covers a portion of first major surface 512a at a corner where first major surface 512a, second side surface 512d, and third side surface 512e meet one another. Eighth underlying electrode layer 527b2 covers a portion of second major surface 512b at a corner where second major surface 512b, second side surface 512d, and third side surface 512e meet one another.

Underlying electrode layers 526, 527 defined by the thin film layer is preferably formed in a thin film formation method such as sputtering or vapor deposition, for example. In particular, underlying electrode layer 526, 527 defined by the thin film layer is preferably a sputtered electrode formed by sputtering. Hereinafter, an electrode formed by sputtering will be described.

When a sputtered electrode defines and functions as underlying electrode layer 526, 527, it is preferable to form the sputtered electrode directly on multilayer body 512 at a portion of first major surface 512a and a portion of second major surface 512b.

Underlying electrode layer 526, 527 that is the sputtered electrode preferably includes, for example, at least one selected from Ni, Cr, Cu, Ti, and the like.

The sputtered electrode in height direction x connecting first major surface 512a and second major surface 512b preferably has a thickness of, for example, about 50 nm or more and about 400 nm or less, and more preferably about 50 nm or more and about 130 nm or less.

Plating layer 528 includes a first plating layer 528a and a second plating layer 528b. First plating layer 528a covers first underlying electrode layer 526a1 and second underlying electrode layer 526a2. Second plating layer 528b covers third underlying electrode layer 526b1 and fourth underlying electrode layer 526b2.

Plating layer 529 includes a third plating layer 529a and a fourth plating layer 529b. Third plating layer 529a covers fifth underlying electrode layer 527a1 and sixth underlying electrode layer 527a2. Fourth plating layer 529b covers seventh underlying electrode layer 527b1 and eighth underlying electrode layer 527b2.

Plating layer 528 and plating layer 529 may each include a plurality of layers. Preferably, plating layer 528 includes a lower plating layer 530 covering underlying electrode layer 526 and an upper plating layer 532 covering lower plating layer 530. Similarly, plating layer 529 includes a lower plating layer 531 covering underlying electrode layer 527 and an upper plating layer 533 covering lower plating layer 531. Of plating layer 528, upper plating layer 532 preferably includes, for example, at least one selected from Ni, Sn, Cu, Ag, Pd, Ag—Pd alloy, Au, and the like. Similarly, of plating layer 529, upper plating layer 533 preferably includes, for example, at least one selected from Ni, Sn, Cu, Ag, Pd, Ag—Pd alloy, Au, and the like.

Lower plating layer 530 includes a first lower plating layer 530a and a second lower plating layer 530b.

First lower plating layer 530a is disposed on multilayer body 512 at first and third side surfaces 512c and 512e free of the underlying electrode layer, and further covers first underlying electrode layer 526a1 disposed on first major surface 512a and second underlying electrode layer 526a2 disposed on second major surface 512b.

Second lower plating layer 530b is disposed on multilayer body 512 at second and fourth side surfaces 512d and 512f free of the underlying electrode layer, and further covers third underlying electrode layer 526b1 disposed on first major surface 512a and fourth underlying electrode layer 526b2 disposed on second major surface 512b.

Lower plating layer 531 includes a third lower plating layer 531a and a fourth lower plating layer 531b.

Third lower plating layer 531a is disposed on multilayer body 512 at first and fourth side surfaces 512c and 512f free of the underlying electrode layer, and further covers fifth underlying electrode layer 527a1 disposed on first major surface 512a and sixth underlying electrode layer 527a2 disposed on second major surface 512b.

Fourth lower plating layer 531b is disposed on multilayer body 512 at second and third side surfaces 512d and 512e free of the underlying electrode layer, and further covers seventh underlying electrode layer 527b1 disposed on first major surface 512a and eighth underlying electrode layer 527b2 disposed on second major surface 512b.

This enables a second plating layer (i.e., upper plating layers 532, 533) to have a uniform or substantially uniform thickness and can, thus, effectively reduce or prevent variation in thickness of the second plating layer (i.e., upper plating layers 532, 533) et. seq.

In the present preferred embodiment, lower plating layers 530, 531 preferably includes Cu, for example. Accordingly, lower plating layers 530 and 531 are defined by Cu plating layers. Lower plating layers 530, 531 are defined by Cu plating layers and cover a surface of underlying electrode layer 526 and that of underlying electrode layer 527 to effectively reduce or prevent penetration by a plating solution.

Further, as shown in FIG. 22, lower plating layer 530 includes a lower layer region 540 located on the side of multilayer body 512 and an upper layer region 542 located between lower layer region 540 and upper plating layer 532. Further, metal grains of a Cu plating layer located in lower layer region 540 have a smaller grain diameter than that of metal grains of a Cu plating layer located in upper layer region 542.

Further, as shown in FIG. 23, lower plating layer 531 includes a lower layer region 541 located on the side of multilayer body 512 and an upper layer region 543 located between lower layer region 541 and upper plating layer 533. Further, metal grains of a Cu plating layer located in lower layer region 541 have a smaller grain diameter than that of metal grains of a Cu plating layer located in upper layer region 543.

Note that a grain diameter of metal grains of a Cu plating layer means a maximum grain diameter of the Cu plating layer in the direction of the thickness thereof.

Lower plating layer 530 including lower layer region 540 with grains having a smaller grain diameter than that of metal grains of a Cu plating layer located in upper layer region 542 can have a reduced compressive stress. Further, lower plating layer 531 including lower layer region 541 with grains having a smaller grain diameter than that of metal grains of a Cu plating layer located in upper layer region 543 can have a reduced compressive stress. As a result, even when thermal stress is applied, tensile stress applied to a peripheral portion of lower plating layers 530, 531 can be reduced or prevented, and cracking of multilayer body 512 due to the thermal stress can be reduced or prevented. Further, lower plating layer 530 including upper layer region 542 with metal grains having a larger grain diameter than that of metal grains of lower layer region 540 and lower plating layer 531 including upper layer region 543 with metal grains having a larger grain diameter than that of metal grains configuring lower layer region 541 are ensured to be thick and can reduce or prevent penetration of multilayer body 512 by moisture. As a result, satisfactorily reliable resistance to moisture can be maintained while stress caused by application of thermal stress is reduced. Note that while in lower plating layer 530, upper layer region 542 includes metal grains having a large grain diameter, and in lower plating layer 531, upper layer region 543 includes metal grains having a large grain diameter, and accordingly, tensile stress due to thermal stress may be generated, lower layer regions 540 and 541 that include metal grains having a small diameter define and function as a barrier layer, and can reduce or prevent cracking attributed to stress caused in upper layer regions 542 and 543.

Lower layer region 540 of lower plating layer 530 preferably has a smaller thickness than upper layer region 542 of lower plating layer 530. Further, lower layer region 541 of lower plating layer 531 preferably has a smaller thickness than upper layer region 543 of lower plating layer 531. This can reduce compressive stress caused in lower plating layers 530 and 531 by application of thermal cycle with respect to multilayer body 512, and effectively reduce or prevent cracking of multilayer body 512 due to the compressive stress.

Lower layer region 540 of lower plating layer 530 and lower layer region 541 of lower plating layer 531 preferably have a thickness of, for example, about 0.2 μm or more and about 1.0 μm or less. When lower layer region 540 of lower plating layer 530 and lower layer region 541 of lower plating layer 531 have a thickness smaller than about 0.2 μm, lower layer regions 540 and 541 defined by Cu plating will be formed discontinuously, and for example, multilayer ceramic capacitor 510 may not be reliably moisture-resistant. In contrast, when lower layer region 540 of lower plating layer 530 and lower layer region 541 of lower plating layer 531 have a thickness larger than about 1.0 μm, the external electrode may include an end portion unsatisfactorily formed as plating is grown.

Upper layer region 542 of lower plating layer 530 and upper layer region 543 of lower plating layer 531 preferably have a thickness of, for example, about 4.0 μm or more and about 8.0 μm or less. When upper layer region 542 of lower plating layer 530 and upper layer region 543 of lower plating layer 531 have a thickness smaller than about 4.0 μm, upper layer regions 542 and 543 defined by Cu plating will be formed discontinuously, and for example, multilayer ceramic capacitor 510 may not be reliably moisture-resistant. In contrast, when upper layer region 542 of lower plating layer 530 and upper layer region 543 of lower plating layer 531 have a thickness larger than about 8.0 μm, the elemental body has a thickness reduced by the amount of the thickness of the plating, and capacitance, strength and the like may not be obtained as desired.

Lower layer region 540 of lower plating layer 530 preferably includes metal grains having a grain diameter of, for example, about 0.20 µm or less, and upper layer region 542 of lower plating layer 530 preferably includes metal grains having a grain diameter of, for example, about 0.50 µm or more. Lower layer region 541 of lower plating layer 531 preferably includes metal grains having a grain diameter of, for example, about 0.20 µm or less, and upper layer region 543 of lower plating layer 531 preferably includes metal grains having a grain diameter of, for example, about 0.50 µm or more. Thus, a stress relaxation effect of lower layer regions 540 and 541 of lower plating layers 530 and 531 can reduce compressive stress caused by application of thermal stress with respect to multilayer body 512, and effectively reduce or prevent cracking of multilayer body 12 due to the compressive stress. Further, by the metal grains of upper layer regions 542, 543 of lower plating layers 530, 531, an advantageous effect is obtained to reduce or prevent unsatisfactory formation of an end portion of the external electrode due to growth of plating. This is because ensuring that lower layer region 540 of lower plating layer 530 and lower layer region 541 of lower plating layer 531 are continuous requires providing a sufficient thickness, and in forming a prescribed thickness, using a bath allowing metal grains to be formed with a small grain diameter facilitates growth of plating. When lower layer region 540 of lower plating layer 530 and lower layer region 541 of lower plating layer 531 include metal grains having a grain diameter larger than about 0.20 µm, compressive stress by application of thermal stress with respect to multilayer body 512 increases, and cracking of multilayer body 512 due to this compression stress may occur. In contrast, when upper layer region 542 of lower plating layer 530 and upper layer region 543 of lower plating layer 531 include metal grains having a grain diameter smaller than about 0.5 µm, upper layer regions 542, 543 of lower plating layers 530, 531 will be discontinuous, and, for example, multilayer ceramic capacitor 510 may not be reliably moisture-resistant.

Upper plating layer 532 includes a first upper plating layer 532a and a second upper plating layer 532b.

First upper plating layer 532a covers first lower plating layer 530a. Specifically, first upper plating layer 532a is preferably disposed on a surface of first lower plating layer 530a located on first and third side surfaces 512c and 512e and also extends to first and second major surfaces 512a and 512b on a surface of first lower plating layer 530a.

Second upper plating layer 532b covers second lower plating layer 530b. Specifically, second upper plating layer 532b is preferably disposed on a surface of second lower plating layer 530b located on second and fourth side surfaces 512d and 512f and also extends to first and second major surfaces 512a and 512b on a surface of second lower plating layer 530b.

Upper plating layer 533 includes a third upper plating layer 533a and a fourth upper plating layer 533b.

First upper plating layer 533a covers first lower plating layer 531a. Specifically, first upper plating layer 533a is preferably disposed on a surface of first lower plating layer 531a located on first and fourth side surfaces 512c and 512f and also extends to first and second major surfaces 512a and 512b on a surface of first lower plating layer 531a.

Second upper plating layer 533b covers second lower plating layer 531b. Specifically, second upper plating layer 533b is preferably disposed on a surface of second lower plating layer 531b located on second and third side surfaces 512d and 512e and also extends to first and second major surfaces 512a and 512b on a surface of second lower plating layer 531b.

In the present preferred embodiment, upper plating layers 532, 533 have a two-layer structure including a Ni plating layer followed by a Sn plating layer, for example. The Ni plating layer can cover a surface of lower plating layer 530, 531 to prevent underlying electrode layers 526, 527 from being eroded by solder when multilayer ceramic capacitor 510 is mounted on a mounting substrate. The Sn plating layer can be provided to improve wettability of solder in mounting multilayer ceramic capacitor 510 on the mounting substrate, and thus facilitate mounting multilayer ceramic capacitor 510.

Upper plating layers 532, 533 are preferably, for example, about 2 µm or more and about 11 µm or less in thickness per layer.

A dimension in length direction z of multilayer ceramic capacitor 510 including multilayer body 512 and external electrodes 524 and 525 is indicated as a dimension L, a dimension in height direction x of multilayer ceramic capacitor 510 including multilayer body 512 and external electrodes 524 and 525 is indicated as a dimension T, and a dimension in width direction y of multilayer ceramic capacitor 510 including multilayer body 512 and electrodes 524 and 525 is indicated as a dimension W for the sake of illustration. Multilayer ceramic capacitor 510 preferably, for example, has a dimension L in length direction z of about 0.45 mm or more and about 0.75 mm or less, a dimension T in height direction x of about 70 µm or more and about 110.0 mm or less, and a dimension W in width direction y to satisfy about $0.85 \leq W/L \leq$ about 1.0.

Multilayer ceramic capacitor 510 shown in FIG. 16 achieves advantageous effects similar to those of multilayer ceramic capacitor 10 described above.

2. Exemplary Variation of Second Preferred

Figure 24A:
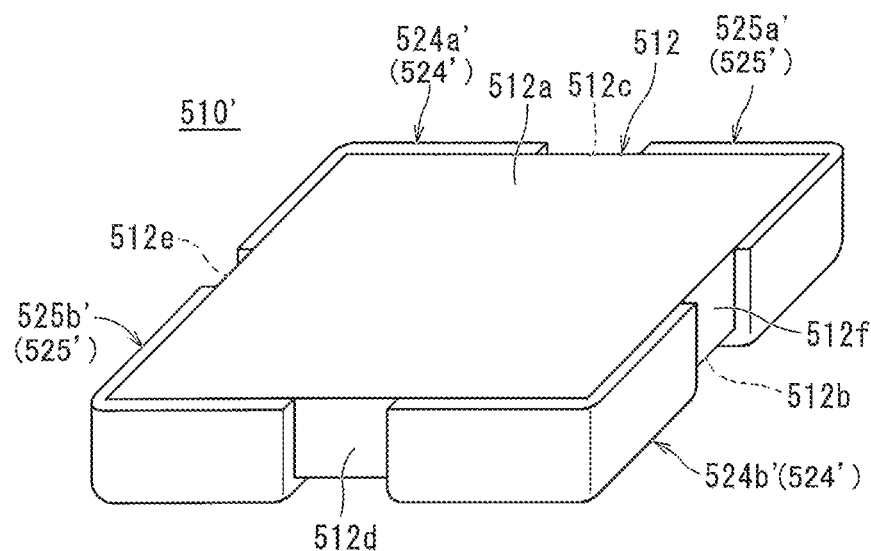
FIG. 24A is an external perspective view of a multilayer ceramic capacitor as an example of a multilayer ceramic electronic component according to an exemplary variation of the second preferred embodiment of the present invention.
Figure 24B:
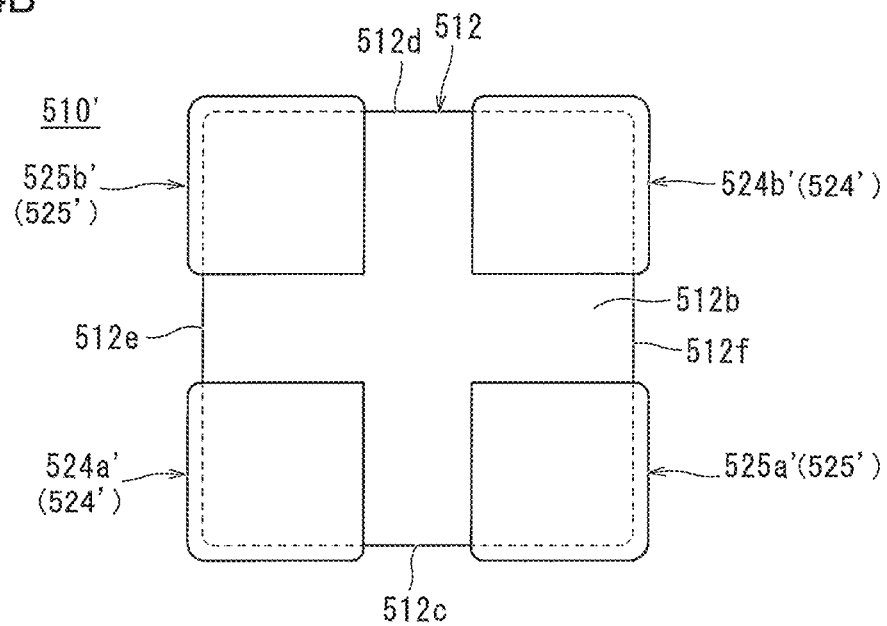
FIG. 24B is a bottom view of the multilayer ceramic capacitor as the example of the multilayer ceramic electronic component according to the exemplary variation of the second preferred embodiment of the present invention.

Subsequently, a multilayer ceramic capacitor according to an exemplary variation of the second preferred embodiment of the present invention will be described. FIG. 24A is an external perspective view of a multilayer ceramic capacitor as an example of a multilayer ceramic electronic component according to an exemplary variation of the second preferred embodiment of the present invention. FIG. 24B is a bottom view of the multilayer ceramic capacitor as the example of the multilayer ceramic electronic component according to the exemplary variation of the second preferred embodiment of the present invention. Any component of multilayer ceramic capacitor 510' shown in FIGS. 24A and 24B that is identical to that of multilayer ceramic capacitor 510 shown in FIGS. 16 to 23 is identically denoted will not be described repeatedly.

Multilayer ceramic capacitor 510' includes a rectangular or substantially rectangular parallelepiped multilayer body 512 and external electrodes 524' and 525'.

External electrode 524' includes a first external electrode 524a' electrically connected to first lead electrode portion 518a of first internal electrode layer 516a, and a second external electrode 524b' electrically connected to second lead electrode portion 520b.

First external electrode 524a' covers first lead electrode portion 520a on first side surface 512c and third side surface 512e, and covers a portion of second major surface 512b. Second external electrode 524b' covers second lead electrode portion 520b on second side surface 512d and fourth side surface 512f, and covers a portion of second major surface 512b.

External electrode 525' includes a third external electrode 525a' electrically connected to third lead electrode portion 521a of second internal electrode layer 516b, and a fourth external electrode 525b' electrically connected to fourth lead electrode portion 521b.

Third external electrode 525a' covers third lead electrode portion 521a on first side surface 512c and fourth side surface 512f, and covers a portion of second major surface 512b. Fourth external electrode 525b' covers fourth lead electrode portion 521b on second side surface 512d and third side surface 512e, and covers a portion of second major surface 512b.

External electrodes 524' and 525' preferably include an underlying electrode layer and a plating layer in this order from the side of multilayer body 512.

Further, plating layers 530 and 531 of multilayer ceramic capacitor 510' according to the present exemplary variation has the same or substantially the same structure as plating layers 530 and 531 of multilayer ceramic capacitor 510.

Multilayer ceramic capacitor 510' shown in FIGS. 24A and 24B achieves advantageous effects similar to that of multilayer ceramic capacitor 510 described above, and also achieves the following advantageous effects. That is, as external electrodes 524' and 525' are not provided on a surface of first major surface 512a, multilayer body 512 can have a thickness increased by an amount corresponding to the absence of the thickness of the external electrodes, and multilayer ceramic capacitor 510' can have improved strength, and capacitance per volume. Further, in mounting, solder can be prevented from wetting an upper surface (i.e., second major surface 512b) of multilayer ceramic capacitor 510', and multilayer body 512 can further be increased in thickness accordingly.

3. Method for Manufacturing Multilayer Ceramic Capacitor

Hereinafter, a non-limiting example of a method for manufacturing multilayer ceramic capacitors 510 and 510' will be described.

Initially, a ceramic green sheet and a conductive paste for an internal electrode are prepared. The ceramic green sheet and the conductive paste for the internal electrode layer include a binder (for example, a known organic binder) and a solvent (for example, an organic solvent).

Subsequently, on the ceramic green sheet, the conductive paste for the internal electrode is printed in a predetermined pattern, for example, by screen-printing, gravure printing or the like to form an internal electrode pattern such as shown in FIGS. 21A and 21B. Specifically, a paste made of a conductive material is applied to the ceramic green sheet in a method such as the above-described printing method or the like, for example, to form a conductive paste layer. The paste made of the conductive material includes, for example, powdery metal with an organic binder and an organic solvent added thereto. For the ceramic green sheet, a ceramic green sheet provided for an outer layer and including no internal electrode pattern printed thereon is also prepared.

A multilayer sheet is produced using such ceramic green sheets each including the internal electrode pattern formed thereon. That is, a predetermined number of ceramic green sheets provided for an outer layer and including no internal electrode pattern printed thereon are stacked, a ceramic green sheet on which an internal electrode pattern corresponding to first internal electrode layer 516a is formed and a ceramic green sheet on which an internal electrode pattern corresponding to second internal electrode layer 516b is formed are alternately stacked thereon, and furthermore, a predetermined number of ceramic green sheets including no internal electrode pattern printed thereon are stacked thereon to prepare a multilayer sheet.

Subsequently, the multilayer body sheet is pressed in the layer stacking direction by, for example, hydrostatic pressing to prepare a multilayer body block.

Further, the multilayer sheet is pressed in the layer stacking direction by, for example, hydrostatic pressing to prepare a multilayer block.

Subsequently, the multilayer block is cut into a predetermined size to produce a multilayer chip. The multilayer chip may be barreled or the like, for example, to round a corner and a ridge.

Figure 25:
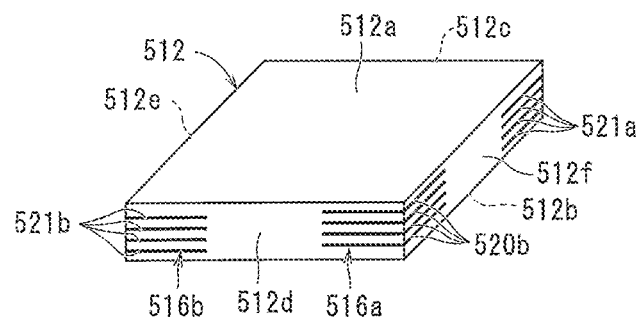
FIG. 25 is an external perspective view of a multilayer body of the multilayer ceramic capacitor shown in FIG. 16.

Subsequently, the multilayer chip is fired to produce multilayer body 512 such as shown in FIG. 25. The firing temperature is preferably about 900° C. or higher and about 1300° C. or lower, for example, although it depends on the ceramic material and the material(s) of the internal electrode.

As shown in FIG. 25, first lead electrode portion 520a of first internal electrode layer 516a is exposed from first and third side surfaces 512c and 512e of multilayer body 512, and third lead electrode portion 521a of second internal electrode layer 516b is exposed from first and fourth side surfaces 512c and 512f of multilayer body 512. Further, second lead electrode portion 520b of first internal electrode layer 516a is exposed from second and fourth side surfaces 512d and 512f of multilayer body 512, and fourth lead electrode portion 521b of second internal electrode layer 516b is exposed from second and third side surfaces 512d and 512e of multilayer body 512.

Figure 26:
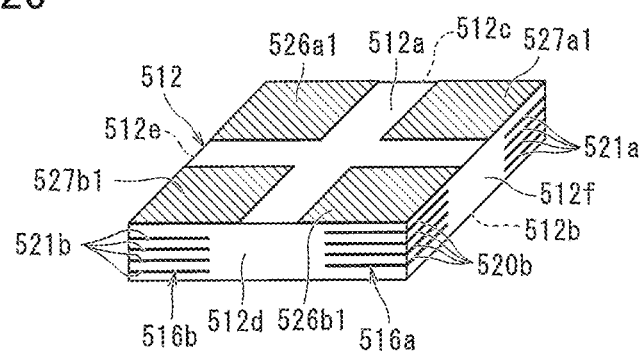
FIG. 26 is an external perspective view in which an underlying electrode layer is provided on the multilayer body shown in FIG. 25.

Subsequently, as shown in FIG. 26, underlying electrode layers 526 and 527 each defined by a thin film electrode layer are formed on multilayer body 512 at a portion of first major surface 512a and a portion of second major surface 512b. Underlying electrode layers 526 and 527 that are a thin film layer can be formed, for example, by sputtering or the like. In other words, an underlying electrode layer that is a thin film layer is defined by a sputtered electrode. The sputtered electrode can be formed of a metal including at least one selected from Ni, Cr, Cu, Ti, and the like, for example.

When external electrodes 524' and 525' are formed such that no external electrode is disposed on first major surface 512a, as in multilayer ceramic capacitor 510', underlying electrode layers 526 and 527 are not formed on first major surface 512a.

Subsequently, a Cu plating layer defining and functioning as first lower plating layer 530a is formed to be disposed on multilayer body 512 at first and third side surfaces 512c and 512e free of the underlying electrode layer, and furthermore, cover first underlying electrode layer 526a1 disposed on first major surface 512a and second underlying electrode layer 526a2 disposed on second major surface 512b, and a Cu plating layer defining and functioning as second lower plating layer 530b is formed to be disposed on multilayer body 512 at second and fourth side surfaces 512d and 512f free of the underlying electrode layer, and furthermore, cover third underlying electrode layer 526b1 disposed on first major surface 512a and fourth underlying electrode layer 526b2 disposed on second major surface 512b. Further, a Cu plating layer defining and functioning as third lower plating layer 531a is formed to be disposed on multilayer body 512 at first and fourth side surfaces 512c and 512f free of the underlying electrode layer, and furthermore, cover fifth underlying electrode layer 527a1 disposed on first major surface 512a and sixth underlying electrode layer 527a2 disposed on second major surface 512b, and a Cu plating layer defining and functioning as fourth lower plating layer 531b is formed to be disposed on multilayer body 512 at second and third side surfaces 512d and 512e free of the underlying electrode layer, and furthermore, cover seventh underlying electrode layer 527b1 disposed on first major surface 512a and eighth underlying electrode layer 527b2 disposed on second major surface 512b. In forming lower plating layers 530a, 530b, 531a and 531b, electroplating using an electroplating bath with an additive added thereto or electroless plating by substitution reaction is performed. By changing a plating condition, lower layer regions 540 and 541 located on the side of multilayer body 512 and upper layer regions 542 and 543 located on the surfaces of lower layer regions 540 and 541 are formed in lower plating layers 530a, 530b, 531a and 531b. The plating condition includes, for example, bath temperature, bath ion concentration, and current density for electrolytic plating. Thus, lower layer regions 540, 541 can be formed of metal grains having a grain diameter smaller than that of metal grains configuring upper layer regions 542, 543.

Figure 27:
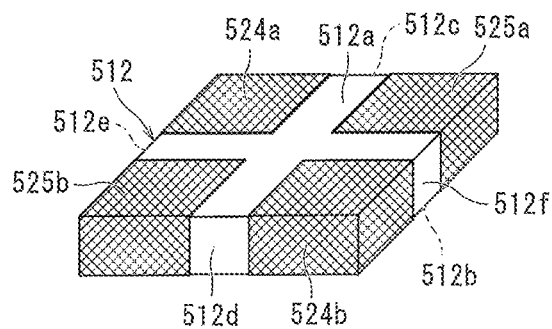
FIG. 27 is an external perspective view in which a plating layer is provided on the multilayer body shown in FIG. 26.

Subsequently, upper plating layer 532 is formed on a surface of lower plating layer 530, and upper plating layer 533 is formed on a surface of lower plating layer 531. Upper plating layers 532, 533 include, for example, at least one selected from Cu, Ni, Sn, Ag, Pd, Ag—Pd alloy, Au, and the like, and are each formed of a single layer or a plurality of layers. Preferably, upper plating layer 532, 533 are formed of a Ni plating layer and a Sn plating layer formed on the Ni plating layer, and are thus each formed of two layers. Thus, external electrodes 524 and 525 are formed as shown in FIG. 27.

Multilayer ceramic capacitors 510 and 510' shown in FIG. 16 or 23 are thus manufactured.

C. Exemplary Experiment

Hereinafter, an exemplary experiment of the present invention will be described in detail. The present exemplary experiment does not limit the present invention.

According to the above-described manufacturing method, a multilayer ceramic capacitor was manufactured as a multilayer ceramic electronic component, and after the lower plating layer was formed, an appearance inspection was conducted to confirm continuity and furthermore, after the upper plating layer was formed, a thermal shock cycle test was conducted for evaluation.

1. Sample in Exemplary Experiment

For the exemplary experiment, Sample Nos. 1 to 24 were prepared. Each sample was prepared by varying metal grains of the lower layer region of the lower plating layer and those of the upper layer region of the lower plating layer in grain diameter and varying the thickness of the lower and upper layer regions. Each sample was structured to be such a multilayer ceramic capacitor as shown in FIG. 1.

A multilayer ceramic capacitor having the FIG. 1 structure and the following specifications was manufactured in the manufacturing method according to the above-described preferred embodiment.

Dimensions of multilayer ceramic capacitor: L×W×T=about 0.6 mm×about 0.3 mm×about 0.08 mm Main component of material of ceramic layer: $BaTiO_3$ Material of internal electrode layer: Ni Structure of external electrode Underlying electrode layer: An underlying electrode layer containing a Ni/Cr alloy as a main component was formed by sputtering. As shown in FIG. 4, the underlying electrode layer was formed on the multilayer body at a portion of the first major surface and a portion of the second major surface, and a corner, and the underlying electrode layer was not formed on the first and second end surfaces.

Structure of Plating Layer

Lower plating layer: Cu plating was applied.

The lower plating layer was formed on the underlying electrode layer at the first and second end surfaces.

Thickness of lower layer region: ranging from about 0.1 μm to about 6.0 μm.

Grain diameter of metal grains constituting lower layer region: ranging from about 0.05 μm to about 2.0 μm.

Thickness of upper layer region: ranging from about 1.0 μm to about 10 μm.

Grain diameter of metal grains constituting upper layer region: ranging from about 0.2 μm to about 2.0 μm.

Upper plating layer: formed of a Ni plating layer and a Sn plating layer, as seen at the multilayer body, for a total of two layers.

2. Evaluation Method (1) Confirmation of Continuity of Lower Plating Layer

After the lower plating layer was formed the appearance inspection was conducted to confirm continuity, as follows: After the lower plating layer was formed, the first and second end surfaces were observed with a microscope, and when the lower plating layer was discontinuous and the ceramic layer or the internal electrode was exposed, an evaluation of NG was made. For each sample number, 100 samples were inspected, and any sample determined as being discontinuous was counted to calculate a defect rate.

(2) Thermal Shock Cycle Test

The thermal shock cycle test was conducted as follows: after the upper plating layer was formed, solder reflow mounting was performed on a predetermined substrate for evaluation, and a bath temperature was changed between about −55° C. and about 85° C. at an interval of about 30 minutes. A change from about −55° C. to about 85° C. was regarded as one cycle, and after it was performed by 200 cycles, each sample was polished in the LT direction for each substrate to expose a cross section. The exposed cross section was observed with a microscope, and a cracked multilayer body was evaluated as NG. For each sample number, 100 samples were tested, and any sample determined as being cracked was counted to calculate a defect rate. A sample having a defect rate of 5% or less was determined to be good.

3. Results of Experiment

Results of the above experiment are shown in Tables 1 and 2.

| | sample no. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 19 | 14 | 15 | 16 |
| dimension L of multilayer ceramic capacitor (μm) | 600 | 600 | 600 | 600 | 600 | 600 | 600 | 600 | 800 | 600 | 600 | 600 | 500 | 600 | 600 | 600 |
| dimension W of multilayer ceramic capacitor (μm) | 300 | 300 | 300 | 300 | 300 | 300 | 300 | 300 | 300 | 300 | 300 | 300 | 300 | 300 | 300 | 300 |

-continued

|  | sample no. | | | | | | | | | | | | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 19 | 14 | 15 | 16 |
| dimension T of multilayer body (µm) | 57 | 57 | 57 | 57 | 57 | 57 | 57 | 57 | 57 | 57 | 57 | 57 | 57 | 57 | 49 | 57 |
| thickness of lower layer region (µm) | 0.1 | 0.2 | 0.5 | 0.5 | 0.5 | 0.5 | 1 | 1 | 1 | 2 | 1.5 | 2 | 4 | 6 | 1 | 1 |
| thickness of upper layer region (µm) | 4 | 4 | 4 | 4 | 4 | 4 | 4 | 4 | 4 | 1 | 1 | 1 | 2 | 2 | 8 | 10 |
| grain diameter of metal grains of lower layer region (µm) | 0.05 | 0.05 | 0.05 | 0.1 | 0.2 | 0.5 | 0.2 | 0.5 | 1 | 2 | 0.5 | 0.5 | 1 | 2 | 0.2 | 0.2 |
| grain diameter of metal grains of upper layer region (µm) | 2 | 2 | 2 | 2 | 2 | 2 | 2 | 2 | 0.5 | 0.5 | 0.5 | 0.5 | 1 | 0.5 | 2 | 2 |
| defect rate through thermal impact cycle test (%) | 0.0 | 0.0 | 0.0 | 0.0 | 0.0 | 2.0 | 0.0 | 2.0 | 10.0 | 16.0 | 7.0 | 9.0 | 20.0 | 61.0 | 0.0 | 5.0 |
| defect rate as a result of confirming continuity of lower plating layer (%) | 70.0 | 0.0 | 0.0 | 0.0 | 0.0 | 0.0 | 0.0 | 0.0 | 0.0 | 0.0 | 57.0 | 44.0 | 0.0 | 0.0 | 0.0 | 0.0 |

TABLE 2

|  | sample no. | | | | | | | |
| --- | --- | --- | --- | --- | --- | --- | --- | --- |
|  | 17 | 18 | 19 | 20 | 21 | 22 | 23 | 24 |
| dimension L of multilayer ceramic capacitor (µm) | 600 | 600 | 600 | 600 | 600 | 600 | 600 | 600 |
| dimension W of multilayer ceramic capacitor (µm) | 300 | 300 | 300 | 300 | 300 | 300 | 300 | 300 |
| dimension T of multilayer body (µm) | 57 | 57 | 57 | 57 | 57 | 57 | 57 | 57 |
| thickness of lower layer region (µm) | 1 | 1 | 1.5 | 0.5 | 0.5 | 0.5 | 1 | 1 |
| thickness of upper layer region (µm) | 4 | 1 | 1 | 4 | 4 | 4 | 4 | 2 |
| grain diameter of metal grains of lower layer region (µm) | 0.2 | 0.2 | 0.2 | 0.2 | 0.2 | 0.2 | 0.1 | 0.1 |
| grain diameter of metal grains of upper layer region (µm) | 0.5 | 0.5 | 0.5 | 1.5 | 1 | 0.5 | 0.2 | 0.2 |
| defect rate through thermal impact cycle test (%) | 0.0 | 0.0 | 3.0 | 0.0 | 0.0 | 0.0 | 0.0 | 2.0 |
| defect rate as a result of confirming continuity of lower plating layer (%) | 0.0 | 70.0 | 0.0 | 0.0 | 0.0 | 0.0 | 10.0 | 44.0 |

Initially, a result of focusing on a relationship between a grain diameter of metal grains of the lower layer region and a grain diameter of metal grains of the upper layer region will be described.

The samples of Sample Nos. 1 to 8 and Sample Nos. 15 to 24, with a lower layer region with metal grains having a grain diameter smaller than that of metal grains of an upper layer region, presented good results in the thermal shock cycle test.

When the samples of Sample Nos. 3 to 6 and those of Sample Nos. 20 to 24 (all having a lower layer region with a thickness of about 0.5 µm) were compared, the samples of Sample Nos. 3 to 5 had a lower layer region with metal grains having a grain diameter of about 0.2 µm or less, and as a result of the thermal shock cycle test, presented any result in continuity of the lower plating layer satisfactorily. Further, Sample Nos. 20 to 22 had an upper layer region with metal grains having a grain diameter of about 0.5 µm or more, and as a result of the thermal shock cycle test, presented any result in continuity of the lower plating layer satisfactorily. Sample Nos. 6 and 8 had a lower layer region with metal grains having a grain diameter of about 0.5 µm, and accordingly, as a result of the thermal shock cycle test, presented a defect rate of about 2.0%.

In contrast, the samples of Sample Nos. 9 to 14 had a lower layer region with metal grains having a grain diameter equal to or larger than that of metal grains of an upper layer region, and as a result of the thermal shock cycle test, all presented a result of about 7% or more and were thus defective.

A result of focusing on a relationship between the thickness of the lower layer region and the thickness of the upper layer region will be described.

The samples of Sample Nos. 1 to 8, 17 and 20 to 24, with a lower layer region having a smaller than an upper layer region, presented good results in the thermal shock cycle test.

Further, Sample Nos. 2 to 5, 7, 15, 17, and 20 to 22 had a lower layer region with metal grains having a grain diameter smaller than that of metal grains of an upper layer region and had a thickness of about 0.2 µm or more and about 1.0 µm or less, and an upper layer region which had a thickness of about 4.0 µm or more and about 8.0 µm or less, and accordingly, as a result of the thermal shock cycle test, presented any result in continuity of the lower plating layer satisfactorily. In contrast, Sample No. 1 had a lower layer region with a thickness of about 0.1 µm, and accordingly, presented a good result in the thermal shock cycle test, although the sample had a lower plating layer presenting a high defect rate of about 70% in continuity as a result. Sample No. 16 had an upper layer region with a thickness of about 10 μm, and accordingly, as a result of the thermal shock cycle test, presented a defect rate of about 5.0%.

Further, when Sample Nos. 5, 7 and 17 to 19 (all having a lower layer region composed of metal grains having a grain diameter of about 0.2 μm) were compared, the samples of Sample Nos. 5, 7 and 17 had a lower layer region with a smaller thickness than an upper layer region, and as a result of the thermal shock cycle test, presented any result in continuity of the lower plating layer satisfactorily. In contrast, the samples of Sample No. 18 had a lower layer region have an equal or substantially equal to an upper layer region, and accordingly, presented a good result in the thermal shock cycle test, although the samples had a lower plating layer presenting a high defect rate of about 70% in continuity as a result, and the samples of Sample No. 19 had a lower layer region with a larger thickness than an upper layer region, and accordingly, as a result of the thermal shock cycle test, presented a defect rate of about 3.0%.

Thus, those samples of each sample number which have a lower layer region with metal grains having a grain diameter smaller than that of metal grains of an upper layer region ensure adhesion with a multilayer body by an underlying electrode layer defined by a thin film layer, and can reduce compressive stress throughout a lower plating layer as the lower layer region includes metal grains having the smaller grain diameter. As a result, it has been confirmed that even when thermal stress is applied, tensile stress applied to a peripheral portion of the lower plating layer can be reduced or prevented, and cracking of the multilayer body due to the thermal stress can be reduced or prevented.

For example, while in the above-described preferred embodiments and each exemplary variation thereof, only examples having a symmetrical or substantially symmetrical shape in front view are illustrated, the multilayer ceramic electronic component according to preferred embodiments of the present invention can have an external shape changed variously depending on to what it is mounted and required performance. Further, the present invention also includes a combination of all or some of the above-described preferred embodiments and each exemplary variation thereof, as appropriate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a multilayer body including a plurality of stacked ceramic layers and including a first major surface and a second major surface opposite to each other in a height direction, a first side surface and a second side surface opposite to each other in a width direction orthogonal or substantially orthogonal to the height direction, and a first end surface and a second end surface opposite to each other in a length direction orthogonal or substantially orthogonal to the height direction and the width direction;
a first internal electrode layer on at least one of the plurality of stacked ceramic layers and exposed at the first end surface;
a second internal electrode layer on at least one of the plurality of ceramic layers and exposed at the second end surface;
a first external electrode connected to the first internal electrode layer and located on the first end surface; and
a second external electrode connected to the second internal electrode layer and located on the second end surface; wherein
the first and second external electrodes include an underlying electrode layer, a lower plating layer on the underlying electrode layer at the first end surface and the second end surface, respectively, and an upper plating layer on the lower plating layer;
the underlying electrode layer includes a thin film electrode including at least one selected from Ni, Cr, Cu, and Ti;
at least a portion of the lower plating layer is connected to corresponding ones of the first internal electrode layer and the second internal electrode layer;
the lower plating layer is a Cu plating layer;
the lower plating layer includes a lower layer region located closer to the multilayer body and an upper layer region located between the lower layer region and the upper plating layer; and
the Cu plating layer in the lower layer region has a metal grain diameter smaller than that of the Cu plating layer in the upper layer region.

2. The multilayer ceramic electronic component according to claim 1, wherein the Cu plating layer in the lower layer region has a metal grain diameter of about 0.20 μm or less, and the Cu plating layer in the upper layer region has a metal grain diameter of about 0.5 μm or more.

3. The multilayer ceramic electronic component according to claim 1, wherein the lower layer region is smaller in thickness than the upper layer region.

4. The multilayer ceramic electronic component according to claim 1, wherein the lower layer region has a thickness of about 0.2 μm or more and about 1.0 μm or less, and the upper layer region has a thickness of about 4.0 μm or more and 8.0 μm or less.

5. The multilayer ceramic electronic component according to claim 1, wherein each of the plurality of stacked ceramic layers has a thickness of about 0.4 μm or more and about 10 μm or less.

6. The multilayer ceramic electronic component according to claim 1, wherein each of the plurality of stacked ceramic layers includes at least one of $BaTiO_3$, $CaTiO_3$, $SrTiO_3$, or $CaZnO_3$ as a main component.

7. The multilayer ceramic electronic component according to claim 6, wherein each of the plurality of stacked ceramic layers further includes at least one of an Mn compound, an Fe compound, a Cr compound, a Co compound, or a Ni compound as a sub-component.

8. The multilayer ceramic electronic component according to claim 1, wherein each of the first and second internal electrode layers has a thickness of about 0.2 μm or more and about 2.0 μm or less.

9. The multilayer ceramic electronic component according to claim 1, wherein the upper plating layer covers the lower plating layer.

10. The multilayer ceramic electronic component according to claim 9, wherein the upper plating layer includes at least one of Ni, Sn, Cu, Ag, Pd, Ag—Pd alloy, or Au.

11. The multilayer ceramic electronic component according to claim 1, wherein each of the plurality of internal electrode layers has a thickness of about 0.2 μm or more and about 2.0 μm or less.

12. A multilayer ceramic electronic component comprising:
- a multilayer body including a plurality of stacked ceramic layers and a plurality of internal electrode layers, and including a first major surface and a second major surface opposite to each other in a height direction, a first side surface and a second side surface opposite to each other in a width direction orthogonal or substantially orthogonal to the height direction, and a third side surface and a fourth side surface opposite to each other in a length direction orthogonal or substantially orthogonal to the height direction and the width direction; and
- a plurality of external electrodes on the side surfaces of the multilayer body; wherein
- the plurality of internal electrode layers include a plurality of first internal electrode layers and a plurality of second internal electrode layers, with the first and second internal electrode layers alternately stacked with the ceramic layer interposed therebetween;
- the first internal electrode layer includes a first lead electrode portion extending to one of the first, second, third and fourth side surfaces, and a second lead electrode portion extending to one side surface other than the side surface to which the first lead electrode portion extends;
- the second internal electrode layer include a third lead electrode portion extending to one of the first, second, third and fourth side surfaces, and a fourth lead electrode portion extending to one side surface other than the side surface to which the third lead electrode portion extends;
- the plurality of external electrodes include a first external electrode connected to the first lead electrode portion, a second external electrode connected to the second lead electrode portion, a third external electrode connected to the third lead electrode portion, and a fourth external electrode connected to the fourth lead electrode portion;
- the first, second, third and fourth external electrodes include an underlying electrode layer, a lower plating layer on the underlying electrode layer at the third side surface and the fourth side surface, and an upper plating layer on the lower plating layer;
- the underlying electrode layer includes a thin film electrode including at least one selected from Ni, Cr, Cu, and Ti;
- at least a portion of the lower plating layer is connected to corresponding ones of the plurality of internal electrode layers;
- the lower plating layer is a Cu plating layer;
- the lower plating layer includes a lower layer region located closer to the multilayer body and an upper layer region located between the lower layer region and the upper plating layer; and
- the Cu plating layer in the lower layer region has a metal grain diameter smaller than that of the Cu plating layer located in the upper layer region.

13. The multilayer ceramic electronic component according to claim 12, wherein the Cu plating layer in the lower layer region has a metal grain diameter of about 0.20 μm or less, and the Cu plating layer in the upper layer region has a metal grain diameter of about 0.5 μm or more.

14. The multilayer ceramic electronic component according to claim 12, wherein the lower layer region is smaller in thickness than the upper layer region.

15. The multilayer ceramic electronic component according to claim 12, wherein the lower layer region has a thickness of about 0.2 μm or more and about 1.0 μm or less, and the upper layer region has a thickness of about 4.0 μm or more and 8.0 μm or less.

16. The multilayer ceramic electronic component according to claim 12, wherein each of the plurality of stacked ceramic layers has a thickness of about 0.4 μm or more and about 10 μm or less.

17. The multilayer ceramic electronic component according to claim 12, wherein each of the plurality of stacked ceramic layers includes at least one of $BaTiO_3$, $CaTiO_3$, $SrTiO_3$, or $CaZnO_3$ as a main component.

18. The multilayer ceramic electronic component according to claim 17, wherein each of the plurality of stacked ceramic layers further includes at least one of an Mn compound, an Fe compound, a Cr compound, a Co compound, or a Ni compound as a sub-component.

19. The multilayer ceramic electronic component according to claim 12, wherein the upper plating layer covers the lower plating layer.

20. The multilayer ceramic electronic component according to claim 19, wherein the upper plating layer includes at least one of Ni, Sn, Cu, Ag, Pd, Ag—Pd alloy, or Au.

* * * * *